(12) United States Patent
Wang et al.

(10) Patent No.: US 10,037,839 B2
(45) Date of Patent: Jul. 31, 2018

(54) MAGNETIC HYDROTALCITE COMPOSITE AND PRODUCTION METHOD THEREOF

(71) Applicant: KYOWA CHEMICAL INDUSTRY CO., LTD., Kagawa (JP)

(72) Inventors: Xing Dong Wang, Kagawa (JP); Yoshihito Iwamoto, Kagawa (JP); Koichi Nedachi, Kagawa (JP)

(73) Assignee: KYOWA CHEMICAL INDUSTRY CO., LTD., Kagawa (JP)

( * ) Notice: Subject to any disclaimer, the term of this patent is extended or adjusted under 35 U.S.C. 154(b) by 192 days.

(21) Appl. No.: 14/911,313

(22) PCT Filed: Dec. 2, 2014

(86) PCT No.: PCT/JP2014/082352
§ 371 (c)(1),
(2) Date: Feb. 10, 2016

(87) PCT Pub. No.: WO2015/083840
PCT Pub. Date: Jun. 11, 2015

(65) Prior Publication Data
US 2016/0203893 A1   Jul. 14, 2016

(30) Foreign Application Priority Data

Dec. 3, 2013  (JP) ................................. 2013-249807

(51) Int. Cl.
| | |
|---|---|
| *C01F 7/00* | (2006.01) |
| *H01F 1/11* | (2006.01) |
| *H01F 1/34* | (2006.01) |
| *C01G 49/00* | (2006.01) |
| *B01J 20/04* | (2006.01) |
| *B01J 20/30* | (2006.01) |
| *B01J 20/02* | (2006.01) |
| *B01J 20/28* | (2006.01) |
| *C01G 37/00* | (2006.01) |
| *C01G 53/00* | (2006.01) |
| *C02F 1/28* | (2006.01) |
| *C02F 101/00* | (2006.01) |
| *C02F 101/10* | (2006.01) |
| *C02F 101/14* | (2006.01) |
| *C02F 101/20* | (2006.01) |
| *C02F 101/22* | (2006.01) |

(52) U.S. Cl.
CPC ............ *H01F 1/11* (2013.01); *B01J 20/0229* (2013.01); *B01J 20/0277* (2013.01); *B01J 20/043* (2013.01); *B01J 20/28009* (2013.01); *B01J 20/3078* (2013.01); *B01J 20/3085* (2013.01); *C01F 7/005* (2013.01); *C01G 37/006* (2013.01); *C01G 49/009* (2013.01); *C01G 53/006* (2013.01); *C02F 1/288* (2013.01); *H01F 1/34* (2013.01); *C01P 2002/22* (2013.01); *C01P 2002/72* (2013.01); *C01P 2004/03* (2013.01); *C01P 2004/80* (2013.01); *C01P 2006/42* (2013.01); *C02F 1/281* (2013.01); *C02F 2101/006* (2013.01); *C02F 2101/103* (2013.01); *C02F 2101/105* (2013.01); *C02F 2101/14* (2013.01); *C02F 2101/206* (2013.01); *C02F 2101/22* (2013.01)

(58) Field of Classification Search
CPC ... H01F 1/11; H01F 1/34; C01F 7/005; C01G 49/0018; B01J 20/0229; B01J 20/041; B01J 20/043; B01J 20/28009; C01P 2002/22; C01P 2006/42
USPC ............................................ 252/62.58, 62.64
See application file for complete search history.

(56) References Cited

FOREIGN PATENT DOCUMENTS

| | | | |
|---|---|---|---|
| CN | 102430411 A | * | 5/2012 |
| CN | 102945717 A | * | 2/2013 |
| JP | 08-337768 | | 12/1996 |
| JP | 09-227127 | | 9/1997 |
| JP | 09-245339 | | 9/1997 |
| JP | 2004-121890 | | 4/2004 |
| JP | 2006-056829 | | 3/2006 |
| JP | 2008-222474 | | 9/2008 |
| JP | 2008222474 A | * | 9/2008 |
| JP | 2009-120783 | | 6/2009 |
| JP | 2009-290176 | | 12/2009 |
| JP | 2011-105573 | | 6/2011 |
| JP | 2012-106227 | | 6/2012 |
| WO | 2006/080467 | | 8/2006 |
| WO | 2011/108195 | | 9/2011 |
| WO | 2012/014583 | | 2/2012 |

OTHER PUBLICATIONS

Machine translation of CN 102430411 A, printed Oct. 13, 2017, 10 pages.*
CN102945717A machine translation, printed Nov. 26, 2017, 11 pages.*
CN102430411A machine translation, printed Nov. 11, 2017, 10 pages.*
JP2008222474A1 machine translation, printed Oct. 13, 2017, 9 pages.*
Ahmet et al., "Magnetically-recoverable Pd-immobilized layered double hydroxide-iron oxide nanocomposite catalyst for carbon-carbon cross-coupling reactions", published online Oct. 23, 2012, Inorganic Chemistry Communications 27, pp. 64-68.*

(Continued)

*Primary Examiner* — Matthew E Hoban
*Assistant Examiner* — Lynne Edmondson
(74) *Attorney, Agent, or Firm* — Wenderoth, Lind & Ponack, L.L.P.

(57) ABSTRACT

A magnetic hydrotalcite composite which is useful in fields such as wastewater treatment, ultraviolet absorption, electromagnetic wave absorption and acid gas absorption, and a production method thereof. The magnetic hydrotalcite composite comprises an inner layer and an outer layer, in which the inner layer is made of a hydrotalcite compound and the outer layer is made of a ferrite compound.

11 Claims, 6 Drawing Sheets

(56) References Cited

OTHER PUBLICATIONS

Hiroshi Hayashi, "On-site Formation of Layered Double Hydroxide Compounds and Application to Water Treatment of Toxic Elements", J. Soc. Powder Technol., vol. 50, pp. 342-347, 2013.
Kazuya Morimoto et al., "Synthesis and Applications of Fe-bearing Layered Double Hydroxides", Clay Science, vol. 49, No. 3, pp. 99-107, 2011.
International Search Report dated Jan. 20, 2015 in International Application No. PCT/JP2014/082352.
International Preliminary Report on Patentability dated Jun. 7, 2016 in International Application No. PCT/JP2014/082352.

\* cited by examiner

Example 22

MAGNETIC HYDROTALCITE COMPOSITE AND PRODUCTION METHOD THEREOF

TECHNICAL FIELD

The present invention relates to a magnetic hydrotalcite composite which is useful as an adsorbent, electromagnetic wave absorbing agent or ultraviolet absorbing agent and a production method thereof.

BACKGROUND ART

Patent Document 1 discloses a method of synthesizing a hydrotalcite compound which can be used as an anion adsorbent by recycling steel slag which is industrial waste. The hydrotalcite compound synthesized by this method is represented by the general formula $[Ca_{2+a-x}M_xAlO_{3+b}]A_y$. When this hydrotalcite compound having this structure is calcined alone, the formed oxide agglomerates, thereby reducing activity. Since this compound has a single hydrotalcite structure, the type of an ion able to be adsorbed is limited.

Non-patent Document 1 discloses a method of treating selenium with Green Rust (GR) and a method of forming a hydrotalcite compound by using MgO as a neutralizer. To treat selenium and a fluorine ion by this method, two different types of hydrotalcite particles suitable for these treatments are required, respectively.

Patent Document 2 discloses a method of synthesizing a cleaning agent by compounding a hydrotalcite compound on the surface of magnesium oxide and a method of treating a harmful substance by using the cleaning agent. The hydrotalcite compound synthesized by this method has the same disadvantage as above.

Non-patent Document 2 discloses the synthesis of a Fe-based hydrotalcite compound and application thereof. Since the particle synthesized by this method is a single-layer Fe-based hydrotalcite compound, it has the same disadvantage as above.

Patent Document 3 discloses a method of synthesizing a Co(II)Fe(III)-LDH particle having low coercive force. The particle synthesized by this method is a Co(II)Fe(III)-LDH particle and a precursor of a CoFe-based ferrite substance. Since it has no CoFe ferrite structure, it cannot fully exhibit physical properties as a magnetic substance.

Patent Document 4 discloses a method of providing an ultraviolet absorbing function by introducing the anion of 2-hydroxy-4-methoxybenzophenone-5-sulfonic acid (abbreviated as BP) between Mg—Al—$NO_3$ type hydrotalcite layers. This method has a disadvantage that a waste liquid after exchange is colored deep yellow, whereby its treatment imposes a great burden on the environment. The method has another disadvantage that use of the particle is limited since the particle after exchange is tinged with deep yellow.

Patent Document 5 discloses a method of preparing a vinyl chloride-based resin composition for use in transparent products by mixing zinc-modified hydrotalcite and 2,4-dihydroxybenzophenone with a resin. This method is used to provide an ultraviolet absorbing function to a resin by mixing zinc-modified hydrotalcite and 2,4-dihydroxybenzophenone having an ultraviolet absorbing function. This method has a disadvantage that when time passes, an organic substance having an ultraviolet absorbing function such as 2,4-dihydroxybenzophenone is decomposed gradually, thereby deteriorating the ultraviolet absorbing function.
(Patent Document 1) WO2011/108195A1
(Patent Document 2) JP-A 2011-188651
(Patent Document 3) JP-A 2008-144412
(Patent Document 4) JP-A 2007-299039
(Patent Document 5) PCT/JP2011/063597
(Non-patent Document 1) Water treatment technique for a harmful element using an on-site forming method of a layered double hydroxide, J. Soc. Powder Technol. Japan, 50, 342-347 (2013)
(Non-patent Document 2) Synthesis and application of a Fe-based layered double hydroxide, Clay Science, Vol. 49, No. 3, p. 99-107, 2010

DISCLOSURE OF THE INVENTION

It is an object of the present invention to provide a magnetic hydrotalcite composite which is useful in fields such as wastewater treatment, ultraviolet absorption, electromagnetic wave absorption and acid gas absorption as well as a production method thereof.

Hydrotalcite compounds have a disadvantage that when they are calcined, they agglomerate with the result of reduced activity. Since conventional hydrotalcite compounds have a single hydrotalcite structure, the type of an ion able to be adsorbed is limited.

The inventors of the present invention found that when a hydrotalcite compound is compounded with a ferrite compound, the agglomeration of the hydrotalcite compound can be prevented if it is calcined. When a plurality of metal ions are contained in the hydrotalcite compound, the hydrotalcite compound can adsorb a plurality of ions.

That is, the present invention includes the following inventions.

1. A magnetic hydrotalcite composite comprising an inner layer and an outer layer, wherein the inner layer is made of a hydrotalcite compound and the outer layer is made of a ferrite compound.
2. The magnetic hydrotalcite composite in the above paragraph 1, wherein the content of the ferrite compound in the outer layer is 0.5 to 95 wt %.
3. The magnetic hydrotalcite composite in the above paragraph 1, wherein the inner layer is made of a hydrotalcite compound represented by the following formula (1) and the outer layer is made of a ferrite compound represented by the following formula (2-1), (2-2) or (2-3).

$$[M^{2+}_{1-x}M^{3+}_x(OH)_2][A^{n-}_{x/n} \cdot yH_2O] \qquad (1)$$

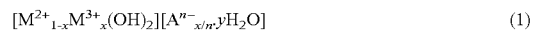

(In the above formula, $M^{2+}$ is at least one divalent metal ion selected from the group consisting of $Mg^{2+}$, $Ca^{2+}$, $Mn^{2+}$, $Fe^{2+}$, $Co^{2+}$, $Ni^{2+}$, $Cu^{2+}$, $Zn^{2+}$, $Sr^{2+}$, $Cd^{2+}$ and $Pb^{2+}$, $M^{3+}$ is at least one trivalent metal ion selected from the group consisting of $La^{3+}$, $Al^{3+}$, $Ga^{3+}$, $Mn^{3+}$, $Co^{3+}$, $Y^{3+}$, $Ce^{3+}$, $Fe^{3+}$, $Cr^{3+}$ and $In^{3+}$, $A^{n-}$, is at least one n-valent anion selected from the group consisting of $CO_3^{2-}$, $SO_4^{2-}$, $Cl^-$, $SiO_3^{2-}$, $PO_4^{3-}$, $NO_3^-$, $CH_3PO_4^{2-}$, $C_2O_4^{2-}$, $HCOO^-$, $CH_3COO^-$ and $CH_3SO_3^-$, x satisfies $0.15 \leq x \leq 0.5$, y satisfies $0 \leq y < 5$, and n is an integer of 1 or more.)

$$AFe_2O_4 \qquad (2-1)$$

(In the above formula, A is at least one selected from the group consisting of Ni, Zn, Cu, Mn, Co and Mg.)

$$XFe_{12}O_{19} \qquad (2-2)$$

(In the above formula, X is at least one selected from the group consisting of Sr, Ba and Pb.)

$$RFe_5O_{12} \qquad (2-3)$$

(In the above formula, R is a rare earth element in the fourth to sixth periods excluding actinoid of group 3 in the Periodic Table.)

4. The magnetic hydrotalcite composite in the above paragraph 3, wherein the atomic ratio of $M^{2+}$ and $M^{3+}$ of the hydrotalcite compound of the inner layer is 1.0:1.0 to 6.0:1.0.

5. The magnetic hydrotalcite composite in the above paragraph 3, wherein the salt of at least one precious metal element selected from the group consisting of Au, Ag, Ru, Pt, Rh, Ir, Rb, Os and Pd is further supported on the outer layer in an amount of 0.2 to 5.0 wt % as a precious metal element.

6. An adsorbent for harmful substances contained in soil, underground water or wastewater, which comprises the magnetic hydrotalcite composite of any one of the above paragraphs 1 to 5.

7. An electromagnetic wave absorbing agent comprising the magnetic hydrotalcite composite of any one of the above paragraphs 1 to 5.

8. An ultraviolet absorbing agent comprising the magnetic hydrotalcite composite of any one of the above paragraphs 1 to 5.

9. A method of producing the magnetic hydrotalcite composite of the above paragraph 1, comprising the steps of:
(1) producing the hydrotalcite compound of an inner layer at 20 to 270° C. by mixing a metal salt containing an element constituting the hydrotalcite compound of the inner layer with an alkaline solution to control the pH value of the resulting solution to 7 to 11;
(2) forming an outer layer at 40 to 250° C. so as to produce a precursor by adding an acidic solution of a metal salt containing an element constituting the ferrite compound of the outer layer and an alkaline solution to slurry containing the obtained hydrotalcite compound to control the pH value of the resulting solution to 7 to 11; and
(3) baking the precursor at a temperature range of 200 to 800° C.

10. The production method in the above paragraph 9, wherein a divalent metal ion salt constituting the hydrotalcite compound of the inner layer is at least one selected from the group consisting of $MgCl_2$, $CaCl_2$, $ZnCl_2$ and $FeCl_2$.

11. The production method in the above paragraph 9, wherein a trivalent metal ion salt constituting the hydrotalcite compound of the inner layer is $AlCl_3$.

12. The production method in the above paragraph 9, wherein an anion salt constituting the hydrotalcite compound of the inner layer is $Na_2CO_3$.

13. The production method in the above paragraph 9, wherein a metal salt containing an element constituting the ferrite compound of the outer layer is at least one selected from the group consisting of $FeCl_3$, $MgCl_2$, $Ni(NO_3)$ and $ZnCl_2$.

BEST MODE FOR CARRYING OUT THE INVENTION

<Magnetic Hydrotalcite Composite>

Figure 1:
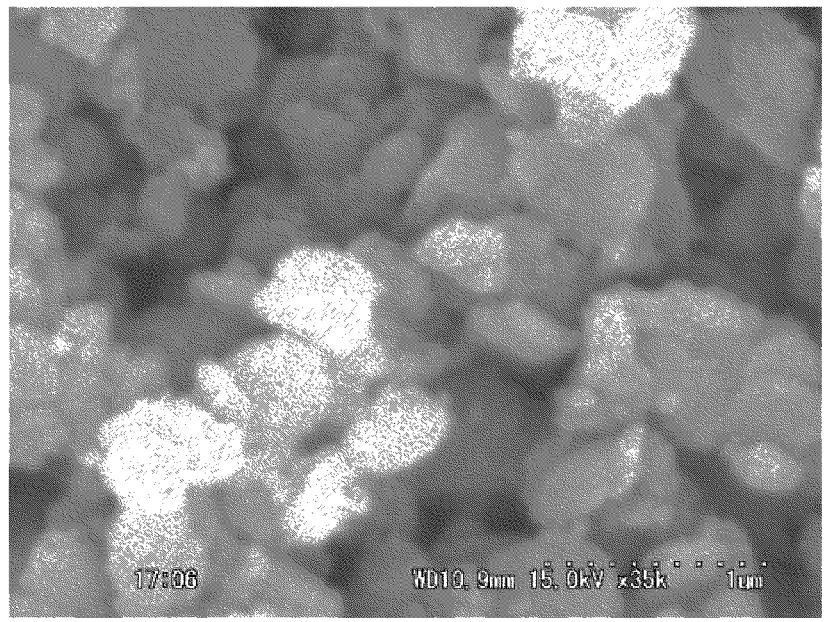
FIG. 1 shows a SEM photo (before calcination) after compounding in Example 9.

The magnetic hydrotalcite composite of the present invention (may be referred to as "magnetic composite" hereinafter) is an inorganic-inorganic composite comprising two or more different types of inorganic particles.

The magnetic composite comprises an inner layer and an outer layer, the inner layer is made of a hydrotalcite compound, and the outer layer is made of a ferrite compound. The hydrotalcite compound of the inner layer is a layered double hydroxide.

The content of the hydrotalcite compound in the inner layer is preferably 5 to 99.5 wt %. The lower limit of the content in the inner layer is preferably 10 wt %, more preferably 15 wt %. The upper limit of the content in the inner layer is preferably 90 wt %, more preferably 85 wt %.

The content of the ferrite compound in the outer layer is preferably 0.5 to 95 wt %. The lower limit of the content in the outer layer is preferably 10 wt %, more preferably 15 wt %. The upper limit of the content in the outer layer is preferably 90 wt %, more preferably 85 wt %.

(Inner Layer)

In the present invention, the inner layer is preferably made of a hydrotalcite compound (layered double hydroxide) having anion exchange capability and represented by the following formula (1).

$M^{2+}$ and $M^{3+}$ are divalent and trivalent metal ions, respectively, and $A^{n-}$ is an n-valent anion. The hydrotalcite compound containing $M^{2+}$ and $M^{3+}$ has the crystal structure of a hydroxide layer (host layer) similar to brucite $[Mg(OH)_2]$ as a basic structure, and the host layer is charged positively by substituting part of the divalent metal by a trivalent metal, whereby an anion and a water molecule are inserted between layers (guest layers).

$M^{2+}$ is at least one divalent metal ion selected from the group consisting of $Mg^{2+}$, $Ca^{2+}$, $Mn^{2+}$, $Fe^{2+}$, $Co^{2+}$, $Ni^{2+}$, $Cu^{2+}$, $Zn^{2+}$, $Sr^{2+}$, $Cd^{2+}$ and $Pb^{2+}$. $M^{2+}$ is preferably at least one divalent metal ion selected from the group consisting of $Mg^{2+}$, $Ca^{2+}$, $Mn^{2+}$, $Fe^{2+}$, $Co^{2+}$, $Ni^{2+}$, $Cu^{2+}$ and $Zn^{2+}$.

$M^{3+}$ is at least one trivalent metal ion selected from the group consisting of $La^{3+}$, $Al^{3+}$, $Ga^{3+}$, $Mn^{3+}$, $Co^{3+}$, $Y^{3+}$, $Ce^{3+}$, $Fe^{3+}$, $Cr^{3+}$ and $In^{3+}$. $M^{3+}$ is preferably at least one trivalent metal ion selected from the group consisting of $Al^{3+}$, $Cr^{3+}$, $Fe^{3+}$, $Co^{3+}$, $In^{3+}$, $Y^{3+}$, $Ce^{3+}$ and $La^{3+}$.

The atomic ratio of $M^{2+}$ and $M^{3+}$ of the hydrotalcite compound of the inner layer is 1.0:1.0 to 6.0:1.0, more preferably 1.3:1.0 to 5.5.0:1.0, much more preferably 1.5:1.0 to 5.0:1.0.

$A^{n-}$ is an anion inserted between the layers of the hydrotalcite compound of the inner layer. Examples of $A^{n-}$ include inorganic anions such as carbonate ion ($CO_3^{2-}$), sulfate ion ($SO_4^{2-}$), chloride ion ($Cl^-$), silicate ion ($SiO_3^{2-}$), phosphate ion ($PO_4^{2-}$), nitrate ion ($NO_3^-$) and hydroxide ion ($OH^-$), organic phosphoric acids such as methyl phosphate ($CH_3PO_4^{2-}$), organic carboxylic acids such as oxalate ion ($C_2O_4^{2-}$), formate ion ($HCOO^-$) and acetate ion ($CH_3COO^-$), and organic sulfonic acids such as methane sulfonic acid ($CH_3SO_3^-$). $A^{n-}$ is preferably at least one n-valent anion selected from the group consisting of $CO_3^{2-}$, $SO_4^{2-}$, $Cl^-$, $SiO_3^{2-}$, $PO_4^{3-}$, $NO_3^-$, $OH^-$, $CH_3PO_4^{2-}$, $C_2O_4^{2-}$, $HCOO^-$, $CH_3COO^-$ and $CH_3SO_3^-$.

"x" satisfies $0.1 \leq x \leq 0.6$. The lower limit of "x" is preferably 0.15, more preferably 0.2. The upper limit of "x" is preferably 0.5, more preferably 0.4.

"y" satisfies $0 \leq y < 5$. The upper limit of "y" is preferably 4, more preferably 3.

(Outer Layer)

The outer layer is preferably made of a ferrite compound represented by the following composition formula (2-1), (2-2) or (2-3).

The ferrite compound is a precursor particle or crystal particle of at least one ferrite substance selected from the group consisting of spinel ferrite, hexagonal ferrite and garnet ferrite.

The spinel ferrite is represented by the following composition formula (2-1).

$$AFe_2O_4 \quad (2\text{-}1)$$

(In the above formula, A is at least one selected from the group consisting of Ni, Zn, Cu, Mn, Co and Mg.)

The hexagonal ferrite is represented by the following composition formula (2-2).

$$XFe_{12}O_{19} \quad (2\text{-}2)$$

(In the above formula, X is at least one selected from the group consisting of Sr, Ba and Pb.)

The garnet ferrite is represented by the following composition formula (2-3).

$$RFe_5O_{12} \quad (2\text{-}3)$$

(In the above formula, R is a rare earth element in the fourth to sixth periods excluding actinoid of group 3 in the Periodic Table.)

(Support of Precious Metal Element)

It is preferred that the salt of at least one precious metal element selected from the group consisting of Au, Ag, Ru, Pt, Rh, Ir, Rb, Os and Pd should be supported on the outer layer in an amount of 0.2 to 5.0 wt % as a precious metal element.

<Production Method of Magnetic Composite>

The magnetic composite can be produced by preparing the hydrotalcite compound of the inner layer (step (1)), precipitating a ferrite compound on the obtained hydrotalcite compound to prepare a precursor (step (2)), and baking the precursor (step (3)).

(Step (1))

The step (1) is to produce a hydrotalcite compound at 20 to 270° C. by mixing a metal salt containing an element constituting the hydrotalcite compound of the inner layer with an alkaline solution to control the pH value of the resulting solution to 7 to 11.

A soluble metal salt may be used as a source of the divalent metal ion ($M^{2+}$) constituting the hydrotalcite compound of the inner layer. The soluble metal salt is a chloride, nitric acid salt or sulfuric acid salt. Examples thereof include $MgCl_2$, $CaCl_2$, $ZnCl_2$, $FeCl_2$, $Mg(NO_3)_2$, $Ca(NO_3)_2$, $Zn(NO_3)_2$, $Fe(NO_3)_2$, $MgSO_4$, $ZnSO_4$ and $FeSO_4$. A hydroxide, oxide or metal powder may also be used besides the soluble metal salt compounds. Examples thereof include MgO, ZnO, $Mg(OH)_2$, $Al(OH)_3$, $Al_2O_3$, metal Zn powder, metal Al and Mg powder.

A soluble metal salt may be used as a source of the trivalent metal ion ($M^{3+}$) constituting the hydrotalcite compound of the inner layer. The soluble metal salt is a chloride, nitric acid salt or sulfuric acid salt. Examples thereof include $AlCl_3$, $Al(NO_3)_3$ and $Al_2(SO_4)_3$. An oxide, metal or hydroxide may also be used besides the soluble metal salt compounds. Examples thereof include metal Al powder, Al(OH)$_3$, $Al_2O_3$ powder, $Fe_2O_3$ powder and metal Fe powder.

Examples of the source of the n-valent anion constituting the hydrotalcite compound of the inner layer include inorganic anions such as carbonate ion ($CO_3^{2-}$), sulfate ion ($SO_4^{2-}$), chloride ion ($Cl^-$), silicate ion ($SiO_3^{2-}$), phosphate ion ($PO_4^{3-}$), nitrate ion ($NO_3^-$) and hydroxide ion ($OH^-$), organic phosphoric acid salts such as methyl phosphate ($CH_3PO_4^{2-}$), organic carboxylic acid salts such as oxalate ion ($C_2O_4^{2-}$), formate ion ($HCOO^-$) and acetate ion ($CH_3COO^-$), and organic sulfonic acid salts such as methane sulfonic acid ($CH_3SO_3^-$). Examples of the salts include sodium salts, potassium salts and ammonium salts.

Examples of the alkaline solution include NaOH, KOH and $NH_3 \cdot H_2O$. A reaction is carried out by controlling the pH value of the resulting solution to 6 to 12. The lower limit of the pH value is preferably 6.5, more preferably 7. The upper limit of the pH value is preferably 11.5, more preferably 11.

The ratio of the soluble salt of the divalent metal ($M^{2+}$) to the soluble salt of the trivalent metal ($M^{3+}$) is preferably such that the atomic ratio of the $M^{2+}$ and $M^{3+}$ of the obtained hydrotalcite compound becomes 1.0:1.0 to 6.0:1.0.

The reaction may be carried out by a wet process. A coprecipitation, hydrothermal or uniform sedimentation process may be advantageously used. The hydrotalcite compound may be obtained as a powdery particle by these processes.

The reaction temperature is preferably 20 to 270° C., more preferably 40 to 200° C., much more preferably 60 to 180° C.

(Step (2))

The step (2) is to produce a precursor by adding an acidic solution of a metal salt containing an element constituting the ferrite compound of the outer layer and an alkaline solution to slurry containing the obtained hydrotalcite compound to control the pH value of the resulting solution to 7 to 11 so as to form the outer layer at 40 to 250° C.

As the metal salt containing an element constituting the ferrite compound of the outer layer, a soluble metal salt may be used. The soluble metal salt is a chloride or oxide. Examples thereof include $FeCl_3$, $MgCl_2$, $Ni(NO_3)$, $ZnCl_2$, MgO, ZnO, $Fe(NO_3)_3$, $Zn(NO_3)_2$ and $Mg(NO_3)_2$.

Examples of the alkaline solution include NaOH, KOH, $NH_3H_2O$ and $Na_2CO_3$. The reaction is carried out by controlling the pH value of the solution to 7 to 12. The lower limit of the pH value is preferably 8, more preferably 9. The upper limit of the pH value is preferably 11.

The reaction temperature is preferably 20 to 250° C., more preferably 40 to 200° C., much more preferably 60 to 180° C.

The precursor of the magnetic composite particle can be obtained by compounding the precursor or crystal particle of the hydrotalcite compound of the inner layer with the precursor or crystal particle of the ferrite compound of the outer layer by a complex polymerization, coprecipitation, hydrothermal or uniform sedimentation process.

<Support of Precious Metal Element>

The salt of at least one precious metal element selected from the group consisting of Au, Ag, Ru, Pt, Rh, Ir, Rb, Os and Pd may be supported on the outer layer of the precursor in an amount of 0.2 to 5.0 wt % as a precious metal element. (Step (3))

The step (3) is to calcine the precursor at a temperature range of 200 to 800° C. The calcination temperature is 200 to 1,500° C., preferably 250 to 1,300° C., much more preferably 300 to 1,100° C. The calcination time is 1 to 30 hours, preferably 1.5 to 20 hours, much more preferably 2 to 15 hours. As the calcination atmosphere, air, nitrogen gas, argon gas or hydrogen gas may be used but air is generally used.

<Use>

The magnetic composite of the present invention may be used as an adsorbent for harmful substances contained in soil, underground water or wastewater. It may also be used as an electromagnetic wave absorbing agent or ultraviolet absorbing agent.

As for the adsorbent, the precursor or crystallized particle of the hydrotalcite compound of the inner layer preferably contains $Al^{3+}$.

As for the electromagnetic wave absorbing agent, the precursor or crystallized particle of the hydrotalcite compound of the inner layer preferably contains $Fe^{3+}$.

EXAMPLES

The following examples are provided for the purpose of further illustrating the present invention but are in no way to be taken as limiting. The magnetic composite which is suitable for use as an adsorbent will be explained in Examples 1 to 13.

Example 1

[Preparation of $MgFe_2O_4$—$Mg_3Al(OH)_8Cl$ Composite Particle (5.0 wt % Composite]
<Synthesis of Inner-Layer Hydrotalcite>

91.5 g (0.45 mol) of $MgCl_2.6H_2O$ and 36.22 g (0.15 mol) of $AlCl_3.6H_2O$ were added to 400 ml of deionized water to prepare an aqueous solution containing Mg and Al. After this aqueous solution was kept at 40° C. for 0.5 hour, 357.2 ml (1.25 mol) of a 3.50 mol/L NaOH solution was added dropwise to this aqueous solution over 20 minutes. This solution containing a precipitate was kept at 40° C. and stirred for 1.0 hour, a hydrothermal treatment was carried out at 170° C. in an autoclave having a capacity of 1.0 L for 8 hours, and then the precipitate was separated by filtration, rinsed and dried at 185° C. to obtain 45 g of a hydrotalcite compound powder.

It could be confirmed by analysis with an X-ray diffraction apparatus (Rigaku X-ray Diffractometer RINT2200) using a copper Kα ray that the obtained powder had a hydrotalcite structure. Further, as a result of analysis with a fluorescent X-ray measurement instrument (Rigaku X-ray Spectrometer RIX2000), the obtained powder was an Mg—Al-based Cl type hydrotalcite compound comprising 44.47 wt % of MgO, 18.7 wt % of $Al_2O_3$ and 13.25 wt % of chlorine and represented by the composition formula

$Mg_{5.99}Al_2(OH)_{15.95}(Cl)_{2.00}$.

<Compounding of $MgFe_2O_4$-Based Particle with Inner-Layer Hydrotalcite)

After 20 g of the above Mg—Al-based Cl type hydrotalcite compound powder was added to 400 ml of deionized water and dispersed at 40° C. for 1 hour, 250 ml of an aqueous solution containing 1.02 g (0.005 mol) of $MgCl_2.6H_2O$ and 2.70 g (0.01 mol) of $FeCl_3.6H_2O$ and 11.43 ml (0.04 mol) of a 3.5 mol/L NaOH solution were added to the above Mg—Al-based Cl type hydrotalcite suspension at the same time by a squeegee pump under agitation over 10 minutes. Further, a heat treatment was carried out at 85° C. for 1 hour under agitation at 350 rpm, and then the obtained precipitate was separated by filtration, rinsed and dried at 105° C. to obtain 21.5 g of a Mg-based magnetic/Mg—Al-based Cl type hydrotalcite precursor powder.

<Calcination>

15 g of the above Mg-based magnetic/Mg—Al-based Cl type hydrotalcite precursor powder was calcined at 500° C. for 2 hours in an air atmosphere and naturally cooled to obtain 11.2 g of a composite particle of the Mg-based magnetic/Mg—Al-based Cl type hydrotalcite compound as Sample 1.

Example 2

[Preparation of $MgFe_2O_4$—$Mg_3Al(OH)_8Cl$ Composite Particle (30.0 wt % Composite)]
<Synthesis of Inner-Layer Hydrotalcite>

The same as in Example 1.

<Compounding of $MgFe_2O_4$-Based Particle with Inner-Layer Hydrotalcite>

After 20 g of the above Mg—Al-based Cl type hydrotalcite powder was added to 400 ml of deionized water and dispersed at 40° C. for 1 hour, 250 ml of an aqueous solution containing 6.1 g (0.03 mol) of $MgCl_2.6H_2O$ and 16.22 g (0.06 mol) of $FeCl_3.6H_2O$ and 68.57 ml (0.24 mol) of a 3.5 mol/L NaOH solution were added to the above Mg—Al-based Cl type hydrotalcite suspension at the same time by a squeegee pump over 30 minutes. Thereafter, a heat treatment was carried out at 85° C. for 1 hour, and the obtained precipitate was separated by filtration, rinsed and dried at 185° C. to obtain 27.5 g of a Mg-based magnetic/Mg—Al-based Cl type hydrotalcite precursor powder. It could be confirmed by X-ray diffraction analysis with a copper Kα ray that the obtained powder had a hydrotalcite structure.

<Calcination>

20 g of the above Mg-based magnetic/Mg—Al-based Cl type hydrotalcite precursor powder was calcined at 500° C. for 2 hours in an air atmosphere and naturally cooled to obtain 14.9 g of a composite particle of the Mg-based magnetic/Mg—Al-based Cl type hydrotalcite compound as Sample 2.

Example 3

[Preparation of $MgFe_2O_4$—$Mg_3Al(OH)_8Cl$ Composite Particle (100.0 wt % Composite)]
<Synthesis of Inner-Layer Hydrotalcite>

The same as in Example 1.

<Compounding of $MgFe_2O_4$-Based Particle with Inner-Layer Hydrotalcite>

After 20 g of the above Mg—Al-based Cl type hydrotalcite powder was added to 400 ml of deionized water and dispersed at 40° C. for 1 hour, 300 ml of an aqueous solution containing 20.33 g (0.1 mol) of $MgCl_2.6H_2O$ and 54.06 g (0.2 mol) of $FeCl_3.6H_2O$ and 228.57 ml (0.8 mol) of a 3.5 mol/L NaOH solution were added to the above Mg—Al-based Cl type hydrotalcite suspension at the same time by a squeegee pump over 50 minutes. Thereafter, a heat treatment was carried out at 85° C. for 1 hour, and the obtained precipitate was separated by filtration, rinsed and dried at 185° C. to obtain 43.0 g of a Mg-based magnetic/Mg—Al-based Cl type hydrotalcite precursor powder. It could be confirmed by X-ray diffraction analysis with a copper Kα ray that the obtained powder had a hydrotalcite structure.
<Calcination>

20 g of the above Mg-based magnetic/Mg—Al-based Cl type hydrotalcite precursor powder was calcinated at 500° C. for 2 hours in an air atmosphere and naturally cooled to obtain 15.8 g of a composite particle of the Mg-based magnetic/Mg—Al-based Cl type hydrotalcite compound as Sample 3.

Example 4

[Preparation of $MgFe_2O_4$—$Mg_3Al(OH)_8Cl$ Composite Particle (30.0 wt % Composite)]

Sample 4 was obtained in the same manner as in Example 2 except that the hydrothermal treatment was carried out at 120° C. for 8 hours in the synthesis of inner-layer hydrotalcite.

Example 5

[Preparation of $MgFe_2O_4$—$Mg_3Al(OH)_8Cl$ Composite Particle (30.0 wt % Composite)]

Sample 5 was obtained in the same manner as in Example 2 except that the hydrothermal treatment was carried out at 150° C. for 8 hours in the synthesis of inner-layer hydrotalcite.

Example 6

[Preparation of $MgFe_2O_4$—$Mg_3Fe(OH)_8Cl$ Composite Particle (5.0 wt % Composite)]

After 20 g of a powder obtained by carrying out the synthesis of inner-layer hydrotalcite in the same manner as in Example 5 was added to 400 ml of deionized water and dispersed at 40° C. for 1 hour, 50 ml of an aqueous solution containing 1.02 g (0.005 mol) of $MgCl_2.6H_2O$ and 2.70 g (0.01 mol) of $FeCl_3.6H_2O$ and 11.43 ml (0.04 mol) of a 3.5 mol/L NaOH solution were added to the above Mg—Al-based Cl type hydrotalcite suspension at the same time by a squeegee pump over 30 minutes. Thereafter, a heat treatment was carried out at 85° C. for 1 hour, and the obtained precipitate was separated by filtration, rinsed and dried at 185° C. to obtain 21.25 g of a Mg-based magnetic/Mg—Al-based Cl type hydrotalcite precursor powder. It could be confirmed by X-ray diffraction analysis with a copper Kα ray that the obtained powder had a hydrotalcite structure.
<Calcination>

15 g of the above Mg-based magnetic/Mg—Al-based Cl type hydrotalcite precursor powder was calcined at 500° C. for 2 hours in an air atmosphere and naturally cooled to obtain 11.8 g of a composite particle of the Mg-based magnetic/Mg—Al-based Cl type hydrotalcite compound as Sample 6.

Example 7

[Compounding of $Ni_{0.6}Zn_{0.4}Fe_2O_4$ with $Mg_3Fe(OH)_8Cl$-Based Hydrotalcite (10.0 wt % Compounding)]
(Synthesis of Inner-Layer Hydrotalcite>
The same as in Example 6.
[Compounding of $Ni_{0.6}Zn_{0.4}Fe_2O_4$ Particle with Inner-Layer Hydrotalcite]

After 20 g of the above Mg—Al-based Cl type hydrotalcite powder was added to 400 ml of deionized water and dispersed at 40° C. for 1 hour, 150 ml of an aqueous solution containing 0.15 g (0.0033 mol) of $ZnCl_2$, 1.45 g (0.005 mol) of $Ni(NO_3)_2.6H_2O$ and 4.51 g (0.017 mol) of $FeCl_3.6H_2O$ and 18.10 ml (0.063 mol) of a 3.5 mol/L NaOH solution were added to the above hydrotalcite suspension at the same time by a squeegee pump over 10 minutes. Thereafter, a heat treatment was carried out at 85° C. for 1 hour under agitation at 350 rpm, and then the obtained precipitate was separated by filtration, rinsed and dried at 185° C. to obtain 22.6 g of a Ni—Zn-based magnetic/Mg—Fe-based Cl type hydrotalcite precursor powder. It could be confirmed by X-ray diffraction analysis with a copper Kα ray that the obtained powder had a hydrotalcite structure.
<Calcination>

15 g of the above powder was calcined at 400° C. for 2 hours in an air atmosphere to obtain 11.6 g of a magnetic composite particle as Sample 7.

Example 8

[Preparation of $Ni_{0.6}Zn_{0.4}Fe_2O_4$—$Mg_3Al(OH)_8(CO_3)_{0.5}$ Composite Particle (5.0 wt % Composite)]
<Synthesis of Inner-Layer Hydrotalcite>

91.5 g (0.45 mol) of $MCl_2.6H_2O$ and 36.22 g (0.15 mol) of $AlCl_3.6H_2O$ were added to 400 ml of deionized water to prepare an aqueous solution containing Mg and Al. After this aqueous solution was kept at 40° C. for 0.5 hour, 357.2 ml (1.25 mol) of a 3.50 mol/L NaOH solution containing 8.0 g (0.075 mol) of $Na_2CO_3$ was added dropwise to this aqueous solution over 20 minutes. This solution containing a precipitate was stirred at 40° C. and 350 rpm for 1.0 hour, and then the precipitate was washed with 1.0 L of a 0.075 mol/L $Na_2CO_3$ aqueous solution. Thereafter, a hydrothermal treatment was carried out at 150° C. in an autoclave having a capacity of 1.0 L for 8 hours, and then the precipitate was separated by filtration, rinsed and dried at 185° C. to obtain 42.8 g of a hydrotalcite powder.

When the obtained hydrotalcite was analyzed with a fluorescent X ray, it was a Mg—Al-based $CO_3$ type hydrotalcite compound comprising 45.33 wt % of MgO, 19.14 wt % of $Al_2O_3$ and 11.49 wt % of $CO_3^{2-}$ and represented by the composition formula $Mg_{5.99}Al_2(OH)_{15.98}(CO_3)_{1.02}$.
<Compounding of $Ni_{0.6}Zn_{0.4}Fe_2O_4$ with Inner-Layer Hydrotalcite>

After 20 g of the above Mg—Al-based $CO_3$ type hydrotalcite powder was added to 400 ml of deionized water and dispersed at 40° C. for 1 hour, 50 ml of an aqueous solution containing 0.23 g ($1.67 \times 10^{-3}$ mol) of $ZnCl_2$, 0.73 g ($2.5 \times 10^{-3}$ mol) of $Ni(NO_3)_2.6H_2O$ and 2.25 g ($8.33 \times 10^{-3}$ mol) of $FeCl_3.6H_2O$ and 9.05 ml (0.032 mol) of a 3.5 mol/L NaOH solution were added to the above hydrotalcite suspension at the same time by a squeegee pump over 5 minutes. Further, a heat treatment was carried out at 85° C. for 1 hour, and then the obtained precipitate was separated by filtration, rinsed and dried at 105° C. to obtain 21.5 g of a Ni—Zn-based magnetic/Mg—Al-based $CO_3$ type hydrotalcite precursor powder. It could be confirmed by X-ray diffraction analysis with a copper Kα ray that the obtained powder had a hydrotalcite structure.
<Calcination>

15 g of the above Ni—Zn-based magnetic/Mg—Al-based $CO_3$ type hydrotalcite precursor powder was calcined at 550° C. for 2 hours in an air atmosphere and naturally cooled to obtain 11.4 g of a composite particle of the Ni—Zn-based magnetic/Mg—Al-based $CO_3$ type hydrotalcite compound as Sample 8.

Example 9

Figure 2:
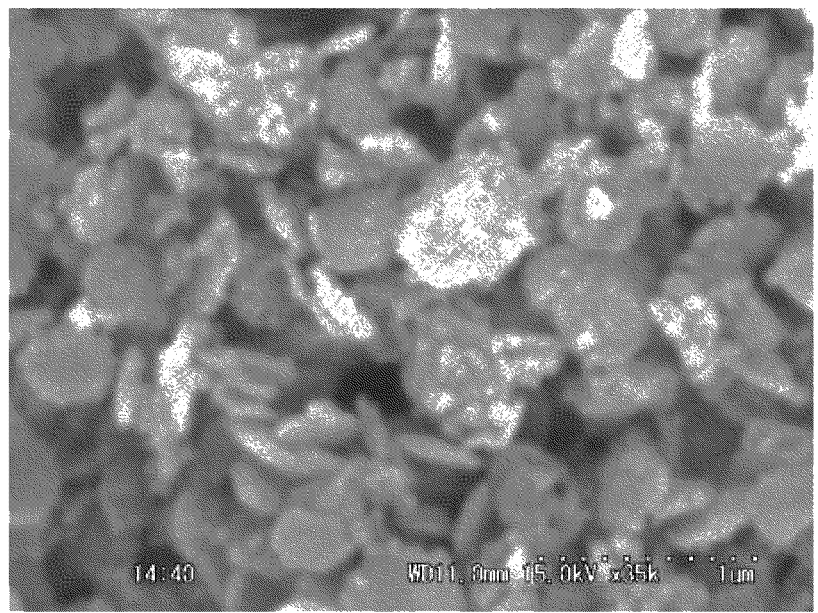
FIG. 2 shows a SEM photo after 2 hours of calcination at 550° C. in an air atmosphere in Example 9.
Figure 3:
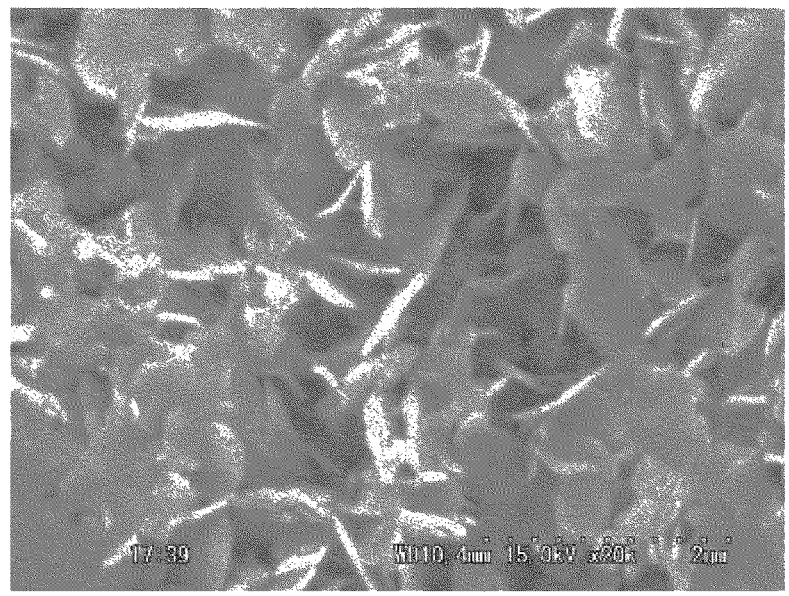
FIG. 3 shows a SEM photo after an exchange treatment with a $MNO_4^-$ aqueous solution in Example 9.

[Preparation of $Ni_{0.6}Zn_{0.4}Fe_2O_4$—$Mg_3Al(OH)_8(CO_3)_{0.5}$ Composite Particle (30.0 wt % Composite)]
<Synthesis of Inner-Layer Hydrotalcite>
The same as in Example 8.
<Compounding of $Ni_{0.6}Zn_{0.4}Fe_2O_4$ with Inner-Layer Hydrotalcite>
After 20 g of the above Mg—Al-based $CO_3$ type hydrotalcite powder was added to 400 ml of deionized water and dispersed at 40° C. for 1 hour, 250 ml of an aqueous solution containing 1.36 g (0.01 mol) of $ZnCl_2$, 4.36 g (0.015 mol) of $Ni(NO_3)_2.6H_2O$ and 13.52 g (0.05 mol) of $FeCl_3.6H_2O$ and 54.30 ml (0.19 mol) of a 3.5 mol/L NaOH solution were added to the above hydrotalcite suspension at the same time by a squeegee pump over 30 minutes. Further, a heat treatment was carried out at 85° C. for 1 hour, and then the obtained precipitate was separated by filtration, rinsed and dried at 185° C. to obtain 27.0 g of a Ni—Zn-based magnetic/Mg—Al-based $CO_3$ type hydrotalcite precursor powder.
<Calcination>
20 g of the above powder was calcined at 550° C. for 2 hours in an air atmosphere and naturally cooled to obtain 15.2 g of a composite particle of the Ni—Zn-based magnetic/Mg—Al-based $CO_3$ type hydrotalcite compound as Sample 9.
<FIGS. 1 to 3>
The particle shape of Sample 9 was photographed with a scanning electron microscope (HITACHI S-3000N; SEM) before and after baking and after exchange with a $KMnO_4$ solution. The SEM photos are shown in FIGS. 1 to 3.
As the method of exchanging with $KMnO_4$, after 1.0 g of $KMnO_4$ was dispersed into 350 ml of deionized water, 20 g of Sample 10 was added and stirred at room temperature for 2 hours to carryout an exchange treatment at 85° C. for 15 hours.

Example 10

[Preparation of $Ni_{0.6}Zn_{0.4}Fe_2O_4$—$Mg_3Al(OH)_8(CO_3)_{0.5}$ Composite Particle (100.0 wt % Composite)]
<Synthesis of Inner-Layer Hydrotalcite>
The same as in Example 8.
<Compounding of $Ni_{0.6}Zn_{0.4}Fe_2O_4$ with Inner-Layer Hydrotalcite>
After 20 g of the above Mg—Al-based $CO_3$ type hydrotalcite powder was added to 400 ml of deionized water and dispersed at 40° C. for 1 hour, 400 ml of an aqueous solution containing 4.53 g (0.033 mol) of $ZnCl_2$, 14.52 g (0.05 mol) of $Ni(NO_3)_2.6H_2O$ and 45.02 g (0.167 mol) of $FeCl_3.6H_2O$ and 180.82 ml (0.633 mol) of a 3.5 mol/L NaOH solution were added to the above hydrotalcite suspension at the same time by a squeegee pump over 50 minutes. Further, a heat treatment was carried out at 85° C. for 1 hour under agitation at 350 rpm, and then the obtained precipitate was separated by filtration, rinsed and dried at 185° C. to obtain 43.0 g of a Ni—Zn-based magnetic/Mg—Al-based $CO_3$ type hydrotalcite precursor powder.
When the surface component was analyzed with a field emission scanning electron microscope (JSM 7800F of JEOL Ltd.; FE-SEM), the atomic ratio of Ni and Zn was 1.51:1 and the atomic ratio of Fe and (Ni+Zn) was 2.02:1 as average values of 10 measurements.
<Calcination>
20 g of the above powder was calcined at 500° C. for 2 hours in an air atmosphere and naturally cooled to obtain 15.8 g of a composite particle of the Ni—Zn-based magnetic/Mg—Al-based $CO_3$ type hydrotalcite compound as Sample 10.

Example 11

[Preparation of $Ni_{0.6}Zn_{0.4}Fe_2O_4$—$Mg_3Al(OH)_8(CO_3)_{0.5}$ Composite Particle (30.0 wt % Composite)]
Sample 11 was obtained in the same manner as in Example 9 except that the hydrothermal treatment was carried out at 120° C. for 8 hours in the synthesis of inner-layer hydrotalcite.

Example 12

[Preparation of $MgFe_2O_4$—$Ca_2Al(OH)_6Cl$ Composite Particle (10.0 wt % Composite)]
<Synthesis of Inner-Layer Hydrotalcite>
58.80 g (0.40 mol) of $CaCl_2.2H_2O$ and 48.29 g (0.20 mol) of $AlCl_3.6H_2O$ were added to 480 ml of deionized water to prepare an aqueous solution containing Ca and Al. After this aqueous solution was kept at 40° C. for 0.5 hour, 342.86 ml (1.20 mol) of a 3.50 mol/L NaOH solution was added dropwise to this aqueous solution over 30 minutes. This solution containing a precipitate was stirred at 40° C. for 1.0 hour, and then a hydrothermal treatment was carried out at 120° C. in an autoclave having a capacity of 1.0 L for 8 hours. The obtained precipitate was separated by filtration, rinsed and dried at 185° C. to obtain 56 g of a Ca—Al-based Cl type hydrotalcite powder.
It could be confirmed by X-ray diffraction analysis with a copper Kα ray that the obtained powder had a hydrotalcite structure. When the obtained Ca—Al-based Cl type hydrotalcite was analyzed with a fluorescent X ray, it was a Ca—Al-based Cl type hydrotalcite compound comprising 45.75 wt % of CaO, 20.90 wt % of $Al_2O_3$ and 14.53 wt % of chlorine and represented by the composition formula $Ca_{3.98}Al_2(OH)_{11.96}(Cl)_{2.00}$.
<Compounding of $MgFe_2O_4$-Based Particle with Inner-Layer Hydrotalcite>
After 20 g of the above Ca—Al-based Cl type hydrotalcite powder was added to 400 ml of deionized water and dispersed at 40° C. for 1 hour, 300 ml of an aqueous solution containing 2.04 g (0.01 mol) of $MgCl_2.6H_2O$ and 5.40 g (0.02 mol) of $FeCl_3.6H_2O$ and 22.86 ml (0.08 mol) of a 3.5 mol/L NaOH solution were added to the above Ca—Al-based Cl type hydrotalcite suspension at the same time by a squeegee pump over 20 minutes. Further, a heat treatment was carried out at 85° C. for 1 hour, and then the obtained precipitate was separated by filtration, rinsed and dried at 105° C. to obtain 22.5 g of a Mg-based magnetic/Ca—Al-based Cl type hydrotalcite precursor powder.
<Calcination>
15 g of the above Mg-based magnetic/Ca—Al-based Cl type hydrotalcite precursor powder was calcined at 500° C. for 2 hours in an air atmosphere and naturally cooled to obtain 11.5 g of a composite particle of the Mg-based magnetic/Ca—Al-based Cl type hydrotalcite compound as Sample 12.

Example 13

[Preparation of $(Mg_{0.6}Ca_{0.4})Fe_2O_4$—$Zn_{1.50}Fe(II)_{1.58}Fe(III)(OH)_{8.16}Cl$ Composite Particle (15.0 wt % Composite)]
<Synthesis of Inner-Layer Hydrotalcite>
62.6 g (0.43 mol; 98% Wako special grade reagent) of $ZnCl_2$ and 153.88 g (0.774 mol; 97% Wako special grade reagent) of $FeCl_2.4H_2O$ were added to 1,000 ml of deionized water to prepare an aqueous solution containing Zn and Fe. After this aqueous solution was kept at 40° C. for 0.5 hour, 613.70 ml (2.148 mol) of a 3.50 mol/L NaOH solution was added dropwise to this aqueous solution over 30 minutes to obtain a pH value of 7.0. This solution containing a precipitate was kept at 37° C. and stirred for 24 hours, and then the precipitate was vacuum dried at 160° C. to obtain 133.58 g of a Zn, Fe—Fe-based Cl type hydrotalcite powder.

It could be confirmed by X-ray diffraction analysis with a copper Kα ray that the obtained powder had a hydrotalcite structure. As a result of chemical analysis, the obtained Zn, Fe—Fe-based Cl type hydrotalcite powder was a Zn, Fe—Fe-based Cl type hydrotalcite compound comprising 29.33 wt % of ZnO, 27.26 wt % of FeO, 19.17 wt % of $Fe_2O_3$ and 8.51 wt % of chlorine, having an atomic ratio of [Zn+Fe(II)] and Fe(III) of 3.08:1 and represented by the composition formula $Zn_{3.00}Fe(II)_{3.16}Fe(III)_2(OH)_{16.32}(Cl)_{2.00}$.

<Compounding of $(Mg_{0.6}Ca_{0.4})Fe_2O_4$-Based Particle with Inner-Layer Hydrotalcite>

After 20 g of the above Zn, Fe—Fe-based Cl type hydrotalcite powder was added to 400 ml of deionized water and dispersed at 40° C. for 1 hour, 300 ml of an aqueous solution containing 1.83 g (0.009 mol) of $MgCl_2.6H_2O$, 0.88 g (0.006 mol) of $CaCl_2.2H_2O$ and 8.11 g (0.03 mol) of $FeCl_3.6H_2O$ and 34.29 ml (0.12 mol) of a 3.5 mol/L NaOH solution were added to the above hydrotalcite suspension at the same time by a squeegee pump over 20 minutes. Further, a heat treatment was carried out at 85° C. for 1 hour, and then the obtained precipitate was separated by filtration, rinsed and dried at 105° C. to obtain 23.5 g of a Mg—Ca-based magnetic/Zn, Fe—Fe-based Cl type hydrotalcite powder.

<Calcination>

15 g of the above Mg—Ca-based magnetic/Zn, Fe—Fe-based Cl type hydrotalcite precursor powder was calcined at 500° C. for 2 hours in an air atmosphere and naturally cooled to obtain 11.5 g of a composite particle of the Mg—Ca-based magnetic/Zn, Fe—Fe-based Cl type hydrotalcite compound as Sample 13.

Comparative Examples 1 to 8

Comparative Example 1

An Mg—Al-based Cl type hydrotalcite compound particle was prepared in the same manner as in Example 1 except that the compounding of the $MgFe_2O_4$-based particle and calcination were not carried out.

Comparative Example 2 $MgFe_2O_4$—$Mg_3Al(OH)Cl$

An Mg—Al-based Cl type hydrotalcite compound particle was prepared in the same manner as in Example 4 except that the compounding of the $MgFe_2O_4$-based particle and calcination were not carried out.

Comparative Example 3 $MgFe_2O_4$—$Mg_3Al(OH)Cl$

An Mg—Al-based Cl type hydrotalcite compound particle was prepared in the same manner as in Example 5 except that the compounding of the $MgFe_2O_4$-based particle and calcination were not carried out.

Comparative Example 4 $Mg_3Fe(OH)Cl$

An Mg—Fe-based Cl type hydrotalcite compound particle was prepared in the same manner as in Example 6 except that 2 hours of calcination at 400° C. in an air atmosphere was not carried out.

Comparative Example 5

An Mg—Al-based $CO_3$ type hydrotalcite compound particle was prepared in the same manner as in Example 8 except that the compounding of the $Ni_{0.6}Zn_{0.4}Fe_2O_4$-based particle and 2 hours of calcination at 550° C. in an air atmosphere were not carried out.

Comparative Example 6

A Ca—Al-based Cl type hydrotalcite compound particle was prepared in the same manner as in Example 8 except that the hydrothermal treatment was carried out at 120° C. for 8 hours and the compounding of the $Ni_{0.6}Zn_{0.4}Fe_2O_4$-based particle and 2 hours of calcination at 550° C. in an air atmosphere were not carried out.

Comparative Example 7

A Ca—Al-based Cl type hydrotalcite compound particle was prepared in the same manner as in Example 12 except that the compounding of the $MgFe_2O_4$-based particle and 2 hours of calcination at 500° C. in an air atmosphere were not carried out.

Comparative Example 8

A Zn, Fe—Fe-based Cl type hydrotalcite compound particle was prepared in the same manner as in Example 13 except that the compounding of the $(Mg_{0.6}Ca_{0.4})Fe_2O_4$-based particle and 2 hours of calcination at 400° C. in an air atmosphere were not carried out.

<Adsorption Test>

The adsorption of ions to the composite particles obtained above was measured. The method of preparing adsorption test samples, adsorption test conditions and test results are shown below.

<Preparation of Aqueous Solutions for Adsorption Test>

Aqueous solution containing 85 mg/L-$Cr_2O_7^{2-}$: 1,000 ml of an aqueous solution containing 0.1158 g of $K_2Cr_2O_7$ which is a standard substance for Wako volumetric analysis was prepared.

Aqueous solution containing 85 mg/L selenate ion ($SeO_4^{2-}$): 1,000 ml of an aqueous solution containing 0.1158 g of Wako reagent $Na_2SeO_4$ (97%) was prepared.

Aqueous solution containing 65 mg/L phosphate ion: 1,000 ml of an aqueous solution containing 0.095 g of Wako reagent $NaH_2PO_4.H_2O$ was prepared.

Aqueous solution containing 100 mg/L fluorine ion: 1,000 ml of an aqueous solution containing 0.2228 g of Wako special grade reagent NaF (97%) was prepared.

Aqueous solution containing 200 mg/L manganate ion ($MnO_4^{2-}$): 1,000 ml of an aqueous solution containing 0.3315 g of Wako special grade reagent $K_2MnO_4$ was prepared.

Aqueous solution containing 20 mg/L $HAsO_4^{2-}$ ion: 1,000 ml of an aqueous solution containing 0.0475 g of Wako reagent $Na_2HAsO_4$ (99%) was prepared.

Aqueous solution containing 75 mg/L strontium ion ($Sr^{2+}$): 1,000 ml of an aqueous solution containing 0.1850 g of Wako special grade reagent $Sr(NO_3)_2$ (98.0% anhydrous) was prepared.

Aqueous solution containing 200 mg/L cesium ion (Cs⁺): 1,000 ml of an aqueous solution containing 0.2936 g of Wako special grade reagent CsNO₃ (99.9%) was prepared.

Aqueous solution containing 200 mg/L cerium ion ($Ce^{3+}$): 1,000 ml of an aqueous solution containing 0.6324 g of Wako special grade reagent $Ce(NO_3)_3 \cdot 6H_2O$ (98%) was prepared.

Mixed acid solution having a total metal concentration of 120 mg/L: 200 ml of an aqueous solution containing 20 ml of a Wako multi-element standard test solution was prepared. The concentration of each element contained in the Wako multi-element standard test solution was 100 mg/L (in 1 mol/L $HNO_3$) and the total number of contained elements was 12 including Al, B, Cd, Cr, Cu, Fe, Mo, Mn, Na, Ph and Zn.

<Adsorption Test 1>

0.5 g of each of the powders of Samples 1 to 13 and Comparative Examples 1 to 8 was added to 100 ml of an aqueous solution containing each of $Cr_2O_7^{2-}$, selenate ion ($SeO_4^{2-}$), phosphate ion, fluorine ion, permanganate ion, diarsenate ion ($HAsO_4^{2-}$), strontium ion ($Sr^{2+}$), cesium ion and cerium ion and kept at 28° C. for 1 hour under agitation. Thereafter, each filtrate was separated by filtration to measure the ion concentration of the filtrate with an inductively coupled plasma emission spectrophotometer (HITACHI SPS3500-DD: ICP). The removal rates obtained by the following equation (3) were calculated from the obtained results and shown in Table 1.

Removal rate (%)=(ion concentration before adsorption−ion concentration after adsorption)/ion concentration before adsorption*100 (3)

When FE-SEM analysis was conducted as an example of the analysis of components on the particle surface after adsorption, 0.48 wt % of Cr and 0.41 wt % of Cr were detected from the surfaces of the composite particles of Example 2 and Example 9, respectively.

TABLE 1

| Sample | Existence of magnetic property (with magnet) | Removal rate of $Cr_2O_7^{2-}$ (%) | Removal rate of $SeO_4^{2-}$ | Removal rate of phosphate ion (%) | Removal rate of fluorine ion (%) | Removal rate of $MnO_4^{2-}$ (%) | Removal rate of $HAsO_4^{2-}$ ion | Removal rate of strontium ion ($Sr^{2+}$) | Removal rate of cesium ion ($Cs^+$) | Removal rate of cerium ion ($Ce^{3+}$) |
|---|---|---|---|---|---|---|---|---|---|---|
| S.1 | Magnetic | 92 | 52 | 96 | 40 | 95 | 5 | 95 | 30 | 32 |
| S.2 | Same as above | 96 | 60 | 99.5 | 50 | 99 | 10 | 98 | 70.5 | 70 |
| S.3 | Same as above | 99.9 | 85 | 99.5 | 75 | 99.9 | 30 | 99 | 99.8 | 99.9 |
| S.4 | Same as above | 98.5 | 75 | 99 | 40 | 99.5 | 65 | 99 | 70 | 73 |
| S.5 | Same as above | 99.5 | 75 | 99 | 40 | 99.9 | 27 | 99 | 68.5 | 70.5 |
| S.6 | Same as above | 99.5 | 97 | 98 | 55 | 98 | 55 | 98 | 75 | 78 |
| S.7 | Same as above | 99.9 | 95 | 99 | 50 | 99 | 25 | 98 | 95 | 96 |
| S.8 | Same as above | 96 | 50 | 15 | 60 | 96 | 18 | 99 | 35 | 38 |
| S.9 | Same as above | 98 | 58 | 22 | 65 | 99.5 | 20 | 99 | 74 | 75 |
| S.10 | Same as above | 99.9 | 75 | 38 | 70 | 99.9 | 20 | 99 | 99.9 | 99.9 |
| S.11 | Same as above | 95 | 59 | 85 | 70 | 99.5 | 20 | 99 | 95 | 96 |
| S.12 | Same as above | 99.5 | 99 | 99 | 99.5 | 99 | 75 | 99.5 | 93 | 95 |
| S.13 | Same as above | 99.9 | 99 | 99 | 99.5 | 99.5 | 80 | 99.5 | 99.9 | 99.9 |
| C. Ex .1 | Nonmagnetic | 35 | 38 | 85 | 10 | 78 | 2 | 5 | 10 | 10.5 |
| C. Ex .2 | Same as above | 20 | 38 | 72 | 10 | 69 | 2 | 5 | 6 | 8 |
| C. Ex. 3 | Same as above | 30 | 38 | 80 | 15 | 75 | 2 | 5 | 8 | 8 |
| C.Ex. 4 | Same as above | 35 | 96 | 30 | 20 | 71 | 35 | 5 | 55 | 53 |
| C. Ex. 5 | Same as above | 20 | 45 | 10 | 10 | 70 | 3 | 5 | 25 | 24 |
| C. Ex. 6 | Same as above | 20 | 41 | 12 | 10 | 68 | 2 | 5 | 18 | 19 |
| C. Ex. 7 | Same as above | 25 | 39 | 30 | 40 | 75 | 10 | 5 | 20 | 20 |
| C. Ex. 8 | Same as above | 70 | 97 | 80 | 35 | 78 | 40 | 5 | 40 | 38 |

S.: Sample,
C. Ex.: Comparative Example

<Adsorption Test 2>

1.0 g of each of the powders of Samples 1 to 13 and Comparative Examples 1 to 8 was added to 200 ml of the prepared multi-element standard aqueous solution and kept at 28° C. for 6 hours under agitation. Thereafter, the obtained filtrate was separated by filtration to measure the concentration of each ion by using ICP (HITACHI SPS3500-DD). The removal rates obtained by the formula (3) were calculated from the obtained results and shown in Table 2.

TABLE 2

| Sample | Cr | Mo | Mn | Ni | Pb | Zn | Cu | Fe | Cd | Al | B | Na |
|---|---|---|---|---|---|---|---|---|---|---|---|---|
| S.1 | 81 | 81.5 | 81.5 | 82 | 91 | 82 | 81 | 80 | 78 | 78 | 58 | 60 |
| S.2 | 90 | 91 | 91 | 92 | 93 | 91 | 92.5 | 92.5 | 91 | 80 | 71.5 | 68 |
| S.3 | 99.9 | 99.9 | 99.9 | 99.5 | 99.9 | 99.5 | 99 | 99.5 | 99.9 | 99.5 | 74 | 68 |
| S.4 | 83 | 84 | 84 | 82 | 84 | 83 | 84.5 | 86 | 86 | 78 | 60.5 | 66.5 |
| S.5 | 86.5 | 89 | 88.5 | 88.5 | 88.5 | 89.5 | 91 | 91.5 | 89.9 | 80 | 70 | 68 |

TABLE 2-continued

| Sample | Cr | Mo | Mn | Ni | Pb | Zn | Cu | Fe | Cd | Al | B | Na |
|---|---|---|---|---|---|---|---|---|---|---|---|---|
| S.6 | 98.4 | 98 | 99.9 | 99.8 | 99.9 | 99.9 | 99.9 | 99.9 | 99.8 | 99.5 | 74 | 76 |
| S.7 | 99.9 | 99.5 | 99.9 | 99.9 | 99.9 | 99.9 | 99.9 | 99.9 | 99.9 | 99.7 | 78 | 79 |
| S.8 | 80 | 80.5 | 80 | 81 | 90 | 81 | 80.5 | 80 | 77.5 | 77.5 | 57 | 58 |
| S.9 | 88.5 | 90 | 91 | 90.5 | 92.5 | 90.5 | 91 | 93.5 | 90 | 79 | 71 | 67.5 |
| S.10 | 99 | 99 | 99 | 99 | 99.5 | 99.5 | 99 | 99.5 | 99.9 | 99.5 | 73 | 69.5 |
| S.11 | 90.5 | 92 | 93.5 | 95.5 | 97.5 | 95.5 | 95.5 | 95.5 | 96 | 90.5 | 73 | 71.5 |
| S.12 | 95.5 | 98 | 97.5 | 99 | 99.5 | 98.5 | 98.5 | 99.5 | 99 | 98.5 | 77 | 78.5 |
| S.13 | 99.5 | 99 | 99.9 | 99.8 | 99.9 | 99.9 | 99.9 | 99.9 | 99.8 | 99.9 | 77 | 79 |
| C.Ex. 1 | 70 | 68 | 67.5 | 69 | 75 | 76 | 72.5 | 71 | 65 | 60 | 55 | 50 |
| C.Ex. 2 | 58.5 | 52 | 60 | 56.5 | 63.5 | 64 | 61.5 | 60 | 58 | 52 | 46 | 41 |
| C.Ex. 3 | 65 | 58.5 | 63.5 | 62.5 | 71.5 | 69.5 | 66 | 65.5 | 62.5 | 57.5 | 52.5 | 46.5 |
| C.Ex. 4 | 80 | 75 | 75 | 80 | 75 | 70 | 75 | 70 | 75 | 70 | 70 | 71 |
| C.Ex. 5 | 69 | 66.5 | 68 | 67.5 | 75 | 75 | 75.5 | 73 | 62.5 | 63.5 | 58.5 | 52 |
| C.Ex. 6 | 53 | 58.5 | 60.5 | 63 | 68 | 68.5 | 70 | 70.5 | 55.5 | 58.5 | 51 | 48.5 |
| C.Ex. 7 | 51 | 55.5 | 58 | 60 | 62 | 63.5 | 68 | 67.5 | 53.5 | 55.5 | 50 | 45.5 |
| C.Ex. 8 | 75 | 78 | 80 | 75 | 80 | 75 | 80 | 70 | 70 | 70 | 50 | 55 |
| KW300S of Kyowa | 54 | 90 | 4 | 7 | 52 | 39 | 83 | 65 | 5 | 0 (415 ppm eluted) | 15 | 0 (15 ppm eluted) |
| KW500SH of Kyowa | 53 | 99.75 | 4 | 7 | 78 | 27 | 73 | 54 | 7 | 0 (214 ppm eluted) | 10 | 0 (15 ppm eluted) |

S.: Sample,
C.Ex.: Comparative Example

<Elution Test 1>

1 g of each sample after adsorption was added to 100 ml of deionized water and kept at 28° C. for 2 hours under agitation. Thereafter, the obtained filtrate was separated by filtration to measure the concentration of each ion by using ICP. The results are shown in Table 3.

TABLE 3

| Item | S. 2 | S. 3 | S. 4 | S. 5 | S. 7 | S. 10 | S. 11 | S. 12 | S. 13 | C. Ex. 1 | C. Ex. 2 | C. Ex. 3 | C. Ex. 5 | C. Ex. 6 | C. Ex. 7 |
|---|---|---|---|---|---|---|---|---|---|---|---|---|---|---|---|
| $CrO_4^{2-}$ | Not detected | ← | ← | ← | ← | ← | ← | ← | ← | 7 | 8 | 7 | 7.5 | 7 | 6.5 |
| $MnO_4^{2-}$ | Not detected | ← | ← | ← | ← | ← | ← | ← | ← | 42 | 44 | 41 | 42 | 40 | 39 |

S.: Sample,
C. Ex.: Comparative Example

<Re-Adsorption Test 1>

Each sample after the adsorption test 1 was added to 500 ml of a 0.05 mol/L $Na_2CO_3$ solution and kept at 28° C. for 0.5 hour under agitation. Thereafter, the resulting solution was filtered, rinsed, dried and calcined under the same conditions as those at the time of production to obtain a recycled sample. The recycled sample was tested for a phosphate ion under the same conditions as in the adsorption test 1. Further, a recycled sample was produced again by the above method after the adsorption test to carry out the same test as the adsorption test 1. The results are shown in Table 4.

TABLE 4

| Item | S. 2 | S. 3 | S. 4 | S. 5 | S. 7 | S. 10 | S. 11 | S. 12 | S. 13 | C. Ex. 1 | C. Ex. 2 | C. Ex. 3 | C. Ex. 5 | C. Ex. 6 | C. Ex. 7 |
|---|---|---|---|---|---|---|---|---|---|---|---|---|---|---|---|
| After first adsorption | 99.5 | 99.5 | 99 | 99.5 | 99 | 99.9 | 99.5 | 99 | 99 | 85 | 72 | 80 | 10 | 12 | 30 |
| First recycling | 99 | 99 | 97 | 99 | 99 | 99.5 | 99 | 97 | 97.5 | 71 | 60 | 69 | 8 | 10 | 22 |
| Second recycling | 98 | 97 | 97 | 95 | 97 | 98.5 | 97 | 97 | 96 | 55 | 38 | 50 | 8 | 8 | 15 |

TABLE 4-continued

| | Sample | | | | | | | | | | | | | | |
|---|---|---|---|---|---|---|---|---|---|---|---|---|---|---|---|
| Item | S. 2 | S. 3 | S. 4 | S. 5 | S. 7 | S. 10 | S. 11 | S. 12 | S. 13 | C. Ex. 1 | C. Ex. 2 | C. Ex. 3 | C. Ex. 5 | C. Ex. 6 | C. Ex. 7 |
| Particle property | Soft | ← | ← | ← | ← | ← | ← | ← | ← | hard | ← | ← | ← | ← | ← |

S.: Sample, C. Ex.: Comparative Example

Figure 4:
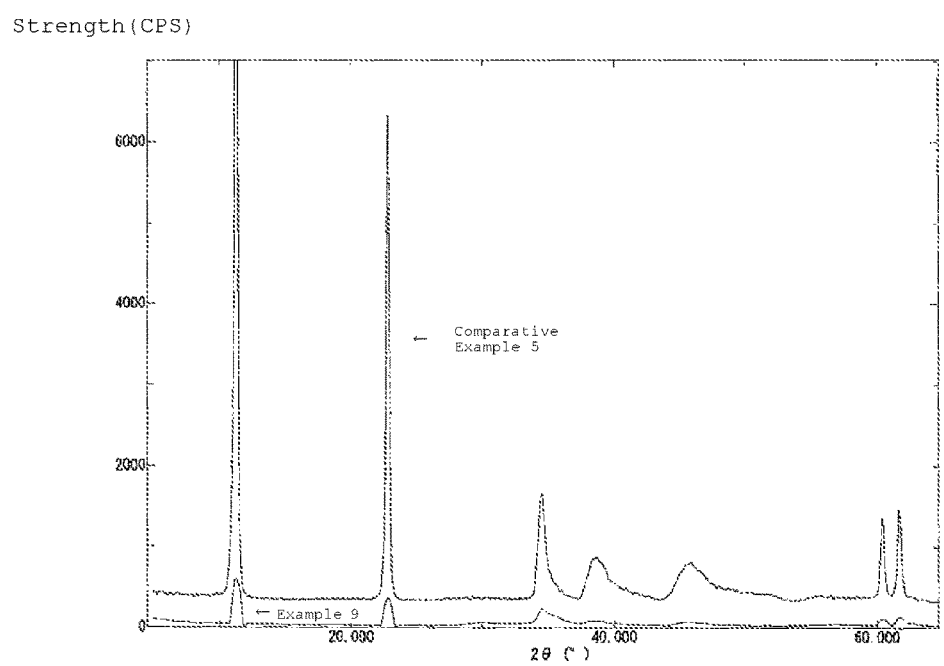
FIG. 4 shows XRD of particles before and after compounding in Example 9.

The results of X-ray diffraction analysis before and after the compounding of the hydrotalcite particles are shown in FIG. 4. The peak strengths of the composite particles after the treatment dropped to 6.6% of the original strengths.

Figure 5:
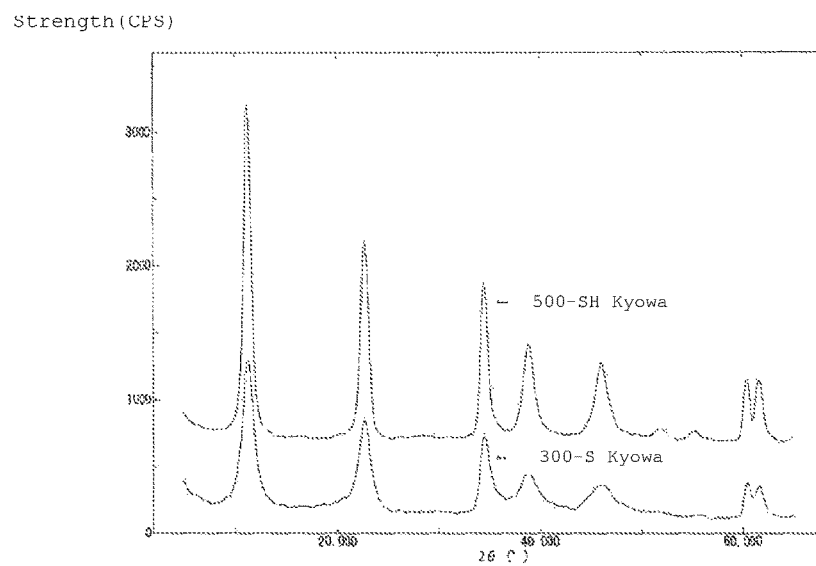
FIG. 5 shows XRD of KW-300S and KW-5005H of Kyowa Chemical Industry, Co., Ltd.

The results of X-ray diffraction analysis of the KW-300S and KW-500SH of Kyowa Chemical Industry Co., Ltd. for comparison shown in Table 2 of the adsorption test are shown in FIG. 5. KW-300S and KW-500SH are 1.25Mg—Al-based $CO_3$ type and 2Mg—Al-based $CO_3$ type hydrotalcites, respectively.

Figure 6:
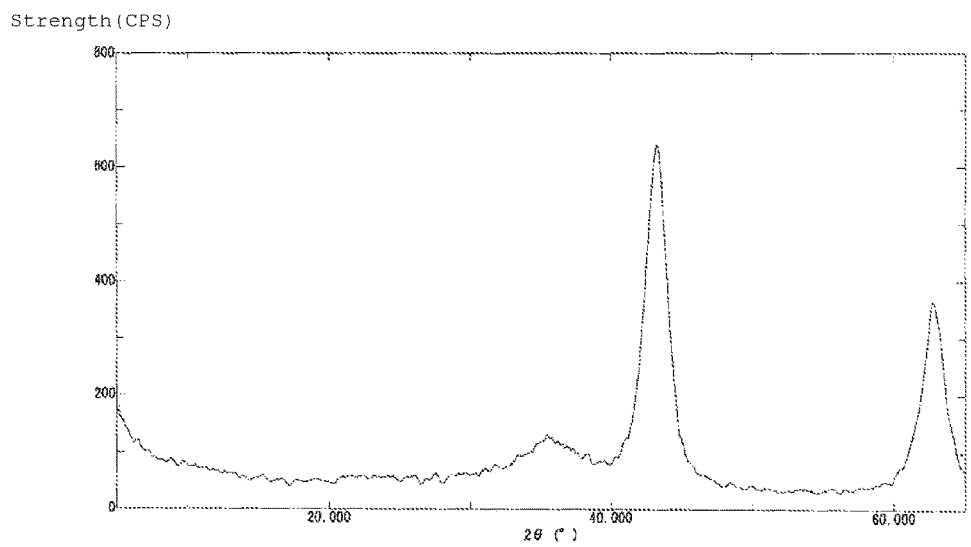
FIG. 6 shows XRD after 2 hours of calcination at 550° C. in Comparative Example 5.
Figure 7:
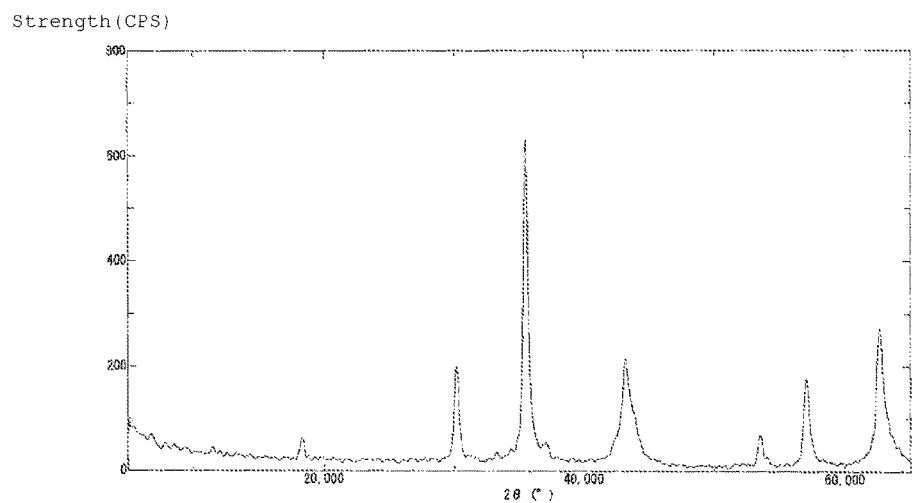
FIG. 7 shows XRD after 2 hours of calcination at 550° C. of the composite particle of Example 9.
Figure 8:
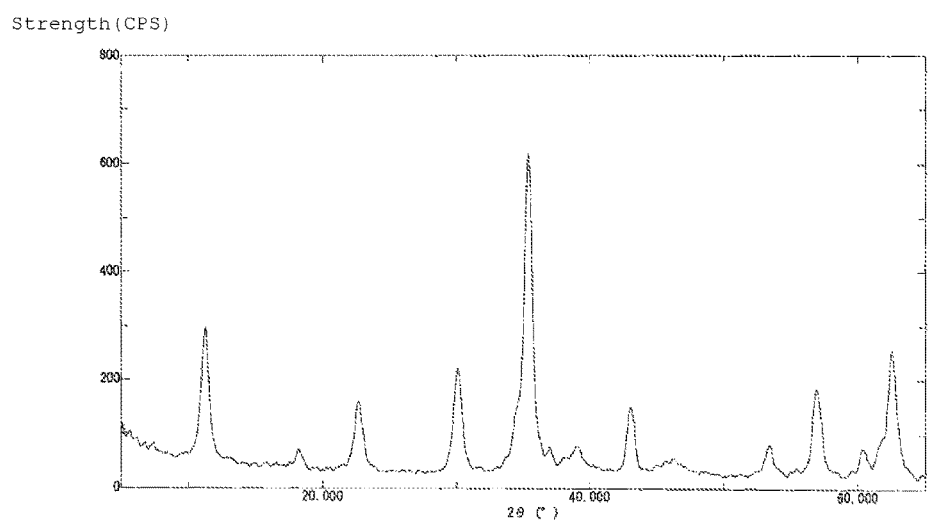
FIG. 8 shows XRD after the exchange treatment of the particle of Comparative Example 9 with a $MnO_4^-$ aqueous solution.

The results of X-ray diffraction analysis of the particle before and after compounding after it was calcined at 550° C. for 2 hours are shown in FIG. 6 and FIG. 7. The result of X-ray diffraction analysis after exchange with the $KMnO_4$ solution is shown in FIG. 8. The peak of hydrotalcite and the peak of the ferrite substance were detected from the particle after exchange.

The magnetic hydrotalcite composite particle of the present invention has excellent adsorption capability. The pH value of the suspension of the particle is not less than 10, and it is conceivable that a heavy metal ion may cause a reaction with the surface of each particle and ion exchange may be carried out between the hydrotalcite layers of the inner layer. Since the ferrite particle of the outer layer has positive charge, an ion which is rarely reactive at a given pH, such as $Cr_2O_7^{2-}$ (or $CrO_4^{2-}$) may be adsorbed by the ferrite particle of the outer layer or ion exchanged between the hydrotalcite layers of the inner layer. In the case of the hydrotalcite particle alone, when the particle is rehydrated after it adsorbs an ion such as $Cr_2O_7^{2-}$ (or $CrO_4^{2-}$), it re-elutes 5 ppm of $Cr^{6+}$. The magnetic hydrotalcite composite particle does not elute $Cr^{6+}$.

As shown in Table 1, the adsorption capability of each particle after compounding becomes higher than those of Comparative Examples. In the multi-element metal ion adsorption test, as shown in Table 2, the adsorption capability of the particle after compounding becomes high. Meanwhile, the adsorption capabilities of KW-300S and KW-500SH of Kyowa Chemical Industry Co., Ltd. are low, and the elution of large amounts of Al and Mg was observed.

The preparation of magnetic hydrotalcite composite particles which are suitable for use as an electromagnetic wave absorbing agent and an ultraviolet absorbing agent will be described in Examples 14 to 23.

Example 14

[Preparation of $NiFe_2O_4$—$Ni_8Al_2(OH)_{20}CO_3$ Composite Particle (10.0 wt % Composite)]
<Synthesis of Inner-Layer Hydrotalcite>

474.76 g (1.60 mol, 98% Wako reagent) of $Ni(NO_3)_2 \cdot 6H_2O$ and 154.69 g (0.40 mol, 97% Wako reagent) of $Al(NO_3)_3 \cdot 9H_2O$ were added to deionized water to prepare 2,000 ml of an acidic aqueous solution containing Ni and Al.

Then, 2,000 ml of the above acidic aqueous solution and 1,142.86 ml (4.0 mol) of a 3.50 mol/L NaOH solution containing 21.20 g (0.2 mol) of $Na_2CO_3$ were added dropwise to 500 ml of 40° C. deionized water at the same time over 180 minutes while they were kept at a pH of 10. After the solution containing a filtrate was kept at 65° C. and stirred for 18 hours, the filtrate was separated by filtration, rinsed and dried at 185° C. to obtain 195 g of a hydrotalcite powder.

It could be confirmed by X-ray diffraction analysis with a copper Kα ray that the obtained powder had a hydrotalcite structure. Further, when the obtained hydrotalcite was analyzed with a fluorescent X ray, it was an Mg—Al-based $CO_3$ type hydrotalcite compound comprising 64.99 wt % of NiO, 11.04 wt % of $Al_2O_3$ and 6.50 wt % of $CO_3^{2-}$ and represented by the composition formula $Ni_{8.10}Al_2(OH)_{20.2}(CO_3)_2$.

<Compounding of $NiFe_2O_4$-Based Particle Containing an Excessive Amount of Ni with Inner-Layer Hydrotalcite>

After 23 g of the above Mg—Al-based $CO_3$ type hydrotalcite powder was added to 400 ml of deionized water and dispersed at 40° C. for 1 hour, 200 ml of an aqueous solution containing 4.45 g (0.015 mol, 98% Wako reagent) of $Ni(NO_3)_2 \cdot 6H_2O$ and 8.16 g (0.02 mol, 99% Wako reagent) of $Fe(NO_3)_3 \cdot 9H_2O$ and 28.57 ml (0.10 mol) of a 3.5 mol/L NaOH solution were added to the above hydrotalcite suspension at the same time by a squeegee pump over 10 minutes. Further, a heat treatment was carried out at 85° C. for 1 hour, and then the obtained precipitate was separated by filtration, rinsed and dried at 105° C. to obtain 27.5 g of a Ni-based magnetic/Mg—Al-based $CO_3$ type hydrotalcite precursor powder.

<Calcination>

15 g of the above Ni-based magnetic/Mg—Al-based $CO_3$ type hydrotalcite precursor powder was calcined at 600° C. for 2 hours in a hydrogen atmosphere and naturally cooled to obtain 11.5 g of a composite particle of the Ni-based magnetic/Mg—Al-based $CO_3$ type hydrotalcite compound as Sample 14.

Example 15

[Preparation of $CuFe_2O_4$—$Cu_4Fe_2(OH)_{12}CO_3$ Composite Particle (10.0 wt % Composite)]
<Synthesis of Inner-Layer Hydrotalcite>

48.36 g (0.20 mol, 99.9% Wako special grade reagent) of $Cu(NO_3)_2 \cdot 3H_2O$ and 41.22 g (0.10 mol, 99% Wako special grade reagent) of $Fe(NO_3)_3 \cdot 9H_2O$ were added to deionized water to prepare 600 ml of an acidic aqueous solution containing Cu and Fe.

Then, 100 ml of an aqueous solution containing 18.00 g (0.17 mol) of $Na_2CO_3$ and 85 ml (0.30 mol) of a 3.50 mol/L NaOH solution were added dropwise to 600 ml of the above 40° C. acidic aqueous solution at the same time under agitation over 30 minutes while they were kept at a pH of 5. The solution containing a precipitate was kept at 40° C. and stirred for 1.0 hour to carry out a hydrothermal treatment at 115° C. for 5 hours in an autoclave having a capacity of 1.0 L. The precipitate was separated by filtration, rinsed and dried at 185° C. to obtain 34.5 g of a Cu—Fe-based $CO_3$ type hydrotalcite powder.

It could be confirmed by X-ray diffraction analysis with a copper Kα ray that the obtained powder had a hydrotalcite structure. Further, when the obtained hydrotalcite was analyzed with a fluorescent X ray, it was a Cu—Fe-based $CO_3$ type hydrotalcite compound comprising 50.51 wt % of CuO, 25.35 wt % of $Fe_2O_3$ and 9.53 wt % of $CO_3^{2-}$ and represented by the composition formula $Cu_4Fe_2(OH)_{12}CO_3$.

<Compounding of $CuFe_2O_4$-Based Particle with Inner-Layer Hydrotalcite>

After 24 g of the above Cu—Fe-based $CO_3$ type hydrotalcite powder was added to 500 ml of deionized water and dispersed at 40° C. for 1 hour, 250 ml of an aqueous solution containing 2.42 g (0.01 mol) of $Cu(NO_3)_2.3H_2O$ and 8.16 g (0.02 mol) of $Fe(NO_3)_3.9H_2O$ and 22.86 ml (0.08 mol) of a 3.5 mol/L NaOH solution were added to the above hydrotalcite suspension at the same time by a squeegee pump over 20 minutes. Further, a heat treatment was carried out at 85° C. for 1 hour, and then the obtained filtrate was separated by filtration, rinsed and dried at 105° C. to obtain 27 g of a Cu—Fe-based magnetic/Cu—Fe-based $CO_3$ type hydrotalcite precursor powder.

<Calcination>

15 g of the above Cu—Fe-based magnetic/Cu—Fe-based $CO_3$ type hydrotalcite precursor powder was calcined at 300° C. for 2 hours in an air atmosphere and naturally cooled to obtain 11.7 g of a composite particle of the Cu—Fe-based magnetic/Cu—Fe-based $CO_3$ type hydrotalcite compound as Sample 15.

Example 16

[Preparation of $CuFe_2O_4$—$Cu_4Cr_2(OH)_{12}CO_3$ Composite Particle (10.0 wt % Composite)]

<Synthesis of Inner-Layer Hydrotalcite>

48.36 g (0.20 mol, 99.9% Wako special grade reagent) of $Cu(NO_3)_2.3H_2O$ and 40.62 g (0.10 mol, 98.5% Wako special grade reagent) of $Cr(NO_3)_3.9H_2O$ were added to deionized water to prepare 500 ml of an acidic aqueous solution containing Cu and Cr.

Then, 100 ml of an aqueous solution containing 18.00 g (0.17 mol) of $Na_2CO_3$ and 85 ml (0.30 mol) of a 3.50 mol/L NaOH solution were added dropwise to 500 ml of the above 40° C. acidic aqueous solution at the same time under agitation over 30 minutes while they were kept at a pH of 4.4. This aqueous solution containing a precipitate was kept at 40° C. and stirred for 1 hour to carry out a hydrothermal treatment at 125° C. for 8 hours in an autoclave having a capacity of 1.0 L. The obtained precipitate was separated by filtration, rinsed and dried at 185° C. to obtain 34.0 g of a Cu—Cr-based $CO_3$ type hydrotalcite powder.

It could be confirmed by X-ray diffraction analysis with a copper Kα ray that the obtained powder had a hydrotalcite structure. Further, when the obtained hydrotalcite was analyzed with a fluorescent X ray, it was a Cu—Cr-based $CO_3$ type hydrotalcite compound comprising 51.14 wt % of CuO, 24.42 wt % of $Cr_2O_3$ and 9.64 wt % of $CO_3^{2-}$ and represented by the composition formula $Cu_4Cr_2(OH)_{12}CO_3$.

<Compounding of $CuFe_2O_4$-Based Particle with Inner-Layer Hydrotalcite>

After 24 g of the above Cu—Cr-based $CO_3$ type hydrotalcite powder was added to 500 ml of deionized water and dispersed at 40° C. for 1 hour, 250 ml of an aqueous solution containing 2.42 g (0.01 mol) of $Cu(NO_3)_2.3H_2O$ and 8.16 g (0.02 mol) of $Fe(NO_3)_3.9H_2O$ and 22.86 ml (0.08 mol) of a 3.5 mol/L NaOH solution were added to the above hydrotalcite suspension at the same time by a squeegee pump over 20 minutes. Further, a heat treatment was carried out 85° C. for 1 hour, and then the obtained precipitate was separated by filtration, rinsed and dried at 105° C. to obtain 27 g of a Cu—Fe-based magnetic/Cu—Cr-based $CO_3$ type hydrotalcite precursor powder.

<Calcination>

15 g of the above Cu—Fe-based magnetic/Cu—Cr-based $CO_3$ type hydrotalcite precursor powder was calcined at 300° C. for 2 hours in an air atmosphere and naturally cooled to obtain 11.5 g of a composite particle of the Cu—Fe-based magnetic/Cu—Cr-based $CO_3$ type hydrotalcite compound as Sample 16.

Example 17

[Preparation of $Ni_{0.5}Co_{0.5}Fe_2O_4$—$Ni_{0.7}Co_{0.1}Mg_{5.2}Al_2(OH)_{16}CO_3$ Composite Particle (10.0 wt % Composite)]

<Synthesis of Inner-Layer Hydrotalcite>

1.19 g (0.004 mol, 98.0% Wako special grade reagent) of $Co(NO_3)_2.6H_2O$, 8.31 g (0.028 mol, 98.0% Wako special grade reagent) of $Ni(NO_3)_2.6H_2O$, 54.42 g (0.208 mol, 98.0% Wako reagent) of $Mg(NO_3)_2.6H_2O$ and 30.94 g (0.08 mol, 97% Wako reagent) of $Al(NO_3)_3.9H_2O$ were added to deionized water to prepare 500 ml of an acidic aqueous solution containing Ni, Co, Mg and Al.

Then, 200.0 ml (0.64 mol) of a 3.20 mol/L NaOH aqueous solution containing 11.31 g (0.105 mol) of $Na_2CO_3$ was added dropwise to 500 ml of the above 40° C. acidic aqueous solution over 30 minutes under agitation while they were kept at a pH of 10. This solution containing a precipitate was kept at 40° C. and stirred for 1.0 hour to carry out a hydrothermal treatment at 150° C. for 8 hours in an autoclave having a capacity of 1.0 L. The precipitate was separated by filtration, rinsed and dried at 185° C. to obtain 25.6 g of a Ni,Co,Mg—Al-based $CO_3$ type hydrotalcite powder.

It could be confirmed by X-ray diffraction analysis with a copper Kα ray that the obtained powder had a hydrotalcite structure. Further, when the obtained hydrotalcite was analyzed with a fluorescent X ray, it was a Ni,Co,Mg—Al-based $CO_3$ type hydrotalcite compound comprising 9.34 wt % of NiO, 1.34 wt % of CoO, 37.46 wt % of MgO, 18.22 wt % of $Al_2O_3$ and 10.73 wt % of $CO_3^{2-}$ and represented by the composition formula $Ni_{0.70}Co_{0.10}Mg_{5.22}Al_2(OH)_{16.04}CO_3$.

<Compounding of $Ni_{0.5}Co_{0.5}Fe_2O_4$-Based Particle with Inner-Layer Hydrotalcite>

After 23 g of the above Ni,Co,Mg—Al-based $CO_3$ type hydrotalcite powder was added to 500 ml of deionized water and dispersed at 40° C. for 1 hour, 250 ml of an aqueous solution containing 1.48 g (0.005 mol, 98.0% Wako special grade reagent) of $Ni(NO_3)_2.6H_2O$, 1.49 g (0.005 mol, 98.0% Wako special grade reagent) of $Co(NO_3)_2.6H_2O$ and 8.16 g (0.02 mol, 99.0% Wako special grade reagent) of $Fe(NO_3)_3.9H_2O$ and 22.86 ml (0.08 mol) of a 3.5 mol/L NaOH solution were added to the above hydrotalcite suspension at the same time by a squeegee pump over 20 minutes. Further, a heat treatment was carried out at 85° C. for 1 hour, and then the obtained precipitate was separated by filtration, rinsed and dried at 110° C. to obtain 26 g of a Ni—Co-based magnetic/Ni,Co,Mg—Al-based $CO_3$ type hydrotalcite precursor powder.

<Calcination>

15 g of the above Ni—Co-based magnetic/Ni,Co,Mg—Al-based $CO_3$ type hydrotalcite precursor powder was calcined at 450° C. for 2 hours in an air atmosphere and naturally cooled to obtain 11.5 g of a composite particle of the Ni—Co-based magnetic/Ni,Co,Mg—Al-based $CO_3$ type hydrotalcite compound.

<Immersion>

Further, the above particle was immersed in the same volume of a 0.01 mol/L $K_2CO_3$ aqueous solution at room temperature and dried at 110° C. for 15 hours to obtain a composite particle of a potassium (K) modified Ni—Co-based magnetic/Ni,Co,Mg—Al-based $CO_3$ type hydrotalcite compound as Sample 17.

Example 18

[Preparation of Au(1.0 wt %)-$Mn_{0.7}Cu_{0.3}Fe_2O_4$ (10.0 wt %)-$Ni_{0.8}Mg_{5.2}Al_2(OH)_{16}CO_3$ Composite Particle]
<Synthesis of Inner-Layer Hydrotalcite>

9.50 g (0.032 mol, 98% Wako special grade reagent) of $Ni(NO_3)_2.6H_2O$, 54.42 g (0.208 mol, 98.0% Wako reagent) of $Mg(NO_3)_2.6H_2O$ and 30.94 g (0.08 mol, 97% Wako reagent) of $Al(NO_3)_3.9H_2O$ were added to deionized water to prepare 500 ml of an acidic aqueous solution containing Ni, Co, Mg and Al.

Then, 200.0 ml (0.64 mol) of a 3.20 mol/L NaOH aqueous solution containing 11.31 g (0.105 mol) of $Na_2CO_3$ was added dropwise to 500 ml of the above 40° C. acidic aqueous solution under agitation over 30 minutes while they were kept at a pH of 10. This solution containing a precipitate was kept at 40° C. and stirred for 1.0 hour to carry out a hydrothermal treatment at 150° C. for 8 hours in an autoclave having a capacity of 1.0 L. The obtained precipitate was separated by filtration, rinsed and dried at 185° C. to obtain 26.0 g of a Ni,Mg—Al-based $CO_3$ type hydrotalcite powder.

It could be confirmed by X-ray diffraction analysis with a copper $K\alpha$ ray that the obtained powder had a hydrotalcite structure. It could be confirmed by X-ray diffraction analysis with a copper $K\alpha$ ray that the obtained powder had a hydrotalcite structure. When the obtained hydrotalcite was analyzed with a fluorescent X ray, it was a Ni,Mg—Al-based $CO_3$ type hydrotalcite compound comprising 12.15 wt % of NiO, 42.65 wt % of MgO, 20.75 wt % of $Al_2O_3$ and 12.21 wt % of $CO_3^{2-}$ and represented by the composition formula $Ni_{0.80}Mg_{5.21}Al_2(OH)_{16.02}CO_3$.

(Compounding of 10.0 wt % of $Mn_{0.7}Cu_{0.3}Fe_2O_4$-Based Particle with Inner-Layer Hydrotalcite>

After 23 g of the above Ni,Mg—Al-based $CO_3$ type hydrotalcite powder was added to 500 ml of deionized water and dispersed at 40° C. for 1 hour, 250 ml of an aqueous solution containing 1.22 g (0.007 mol, 97.0% Wako reagent) of $MnSO_4.H_2O$, 0.73 g (0.003 mol, 99.9% Wako special grade reagent) of $Cu(NO_3)_2.3H_2O$ and 8.16 g (0.02 mol, 99.0% Wako special grade reagent) of $Fe(NO_3)_3.9H_2O$ and 22.86 ml (0.08 mol) of a 3.5 mol/L NaOH solution were added to the above hydrotalcite suspension at the same time by a squeegee pump over 20 minutes. Further, a heat treatment was carried out at 85° C. for 1 hour, and then the obtained precipitate was separated by filtration, rinsed and dried at 105° C. to obtain 26 g of a Mn—Cu—Fe-based magnetic/Ni,Mg—Al-based $CO_3$ type hydrotalcite precursor powder.

<Compounding of 1.0 wt % of Au with Mn—Cu—Fe-Based Magnetic/Ni,Mg—Al-Based $CO_3$ Type Hydrotalcite Precursor>

After 20 g of the above Mn—Cu—Fe-based magnetic/Ni,Mg—Al-based $CO_3$ type hydrotalcite precursor powder was added to 500 ml of deionized water and dispersed at 40° C. for 1 hour, 200 ml of an aqueous solution containing 0.404 g of $Na[AuCl_4].2H_2O$ was added by a squeegee pump over 20 minutes while the agitation speed was kept at 350 rpm. The resulting solution was aged at 40° C. for 1 hour, and then the obtained precipitate was separated by filtration, rinsed and dried at 105° C. to obtain an Au—[Mn—Cu—Fe]-based magnetic/Ni,Mg—Al-based $CO_3$ type hydrotalcite precursor powder. As a result of ICP analysis, the content of Au was 1.0 wt %.

<Calcination>

15 g of the above powder was calcined at 400° C. for 2 hours in an air atmosphere and naturally cooled to obtain 11.5 g of a composite particle of the Au—[Mn—Cu—Fe]-based magnetic/Ni,Mg—Al-based $CO_3$ type hydrotalcite compound as Sample 18.

Example 19

[Preparation of Ru (1 wt %)-$Ni_{0.5}Co_{0.5}Fe_2O_4$ (10 wt %)-$Ni_{0.7}Co_{0.1}Mg_{5.2}Al_2(OH)_{16}CO_3.4H_2O$ Composite Particle]
<Compounding of Inner-Layer Hydrotalcite>

A $Ni_{0.5}Co_{0.5}Fe_2O_4$—$Ni_{0.7}Co_{0.1}Mg_{5.2}Al_2(OH)_{16}CO_3.4H_2O$ composite particle was prepared in the same manner as in Example 17.

<Compounding of 1.0 wt % of Ru with Ni—Co-Based Magnetic/Ni, Co, Mg—Al-Based $CO_3$ Type Hydrotalcite Precursor>

5.123 g of $Ru(NO_3)_3$ having a concentration of 11.09 wt % was dispersed into 250 ml of deionized water, 20 g of the Ni—Co-based magnetic/Ni,Co,Mg—Al-based $CO_3$ type hydrotalcite precursor powder was added under agitation and dispersed at 28.0° C. for 1 hour, and the resulting solution was concentrated and dried at 85° C. under agitation to obtain a composite particle containing Ru as Sample 19. As a result of analysis, it contained 7.05 wt % of Ni, 2.00 wt % of Co, 4.32 wt % of Fe, 18.2 wt % of Mg, 7.77 wt % of Al and 1.00 wt % of Ru.

Example 20

[Exchange Between $Ni_{0.6}Zn_{0.4}Fe_2O_4$—$Mg_3Al(OH)_8(CO_3)_{0.5}$ and $KMnO_4$ Aqueous Solution]

The method of preparing a particle before exchange was the same as in Example 10 (Sample 10).

After 1.0 g of $KMnO_4$ was dispersed into 350 ml of deionized water, 20 g of Sample 10 was added to the resulting suspension and stirred at room temperature for 2 hours to carry out an exchange treatment at 85° C. for 15 hours. The aqueous solution after exchange became transparent. The obtained precipitate was separated by filtration, rinsed and vacuum dried at 80° C. for 10 hours to obtain Sample 20.

Example 21

[Preparation of $Ni_{0.5}Co_{0.5}Fe_2O_4$—$Cu_4Fe_2(OH)_{12}(CO_3)$ Composite Particle (100.0 wt % Composite)]
<Synthesis of Inner-Layer Hydrotalcite>

The synthesis of inner-layer hydrotalcite was the same as in Example 16.

<Compounding of 100 wt % of $Ni_{0.5}Co_{0.5}Fe_2O_4$ with $Cu_4Fe_2(OH)_{12}(CO_3)$ Particle>

After 34 g of the $Cu_4Fe_2(OH)_{12}(CO_3)$ particle obtained by the method of Example 16 was added to 400 ml of deionized water and dispersed at 40° C. for 1 hour, 600 ml of an aqueous solution containing 21.51 g (0.0725 mol, Wako reagent, 98 wt %) of $Ni(NO_3)_2.6H_2O$, 21.53 g (0.0725 mol, Wako reagent, 98 wt %) of $Co(NO_3)_2.6H_2O$ and 117.28 g (0.29 mol, Wako reagent, 99.9 wt %) of $Fe(NO_3)_3.9H_2O$ and 331.43 ml (1.16 mol) of a 3.5 mol/L NaOH solution were added to the above hydrotalcite suspension at the same time by a squeegee pump over 80 minutes. Further, a heat treatment was carried out at 85° C. for 1 hour under agitation, and then the obtained precipitate was separated by filtration, rinsed and dried at 185° C. to obtain 69.5 g of a Ni—Co-based magnetic/Cu—Fe-based $CO_3$ type hydrotalcite compound composite particle precursor.

<Calcination>

50 g of the above Ni—Co-based magnetic/Cu—Fe-based $CO_3$ type hydrotalcite composite precursor powder was calcined at 500° C. for 2 hours in an air atmosphere and naturally cooled to obtain 38 g of a Ni—Co-based magnetic/Cu—Fe-based $CO_3$ type hydrotalcite compound particle as Sample 21.

Example 22

[Preparation of $SrFe_{12}O_{19}$—$Mg_6Fe_2(OH)_{16}(Cl)_{2.0}$ Composite Particle (100.0 wt % Composite)]

<Synthesis of Inner-Layer Hydrotalcite>

The synthesis of inner-layer hydrotalcite was the same as in Example 6.

<Compounding of 100 wt % of $SrFe_{12}O_{19}$ with $Mg_6Fe_2(OH)_{16}(Cl)_{2.0}$ Particle>

After 53 g of the $Mg_6Fe_2(OH)_{16}(Cl)_{2.0}$ particle obtained by the method of Example 6 was added to 300 ml of deionized water and dispersed at 40° C. for 1 hour, 500 ml of an aqueous solution containing 10.80 g (0.05 mol, Wako reagent, 98 wt %) of $Sr(NO_3)_2$, 244.85 g (0.60 mol, Wako reagent, 99.9 wt %) of $Fe(NO_3)_3.9H_2O$ and 74 g (0.35 mol, Wako reagent, 99.9 wt %) of citric acid $C_6H_8O_7.H_2O$ was added to the above hydrotalcite suspension by a squeegee pump over 80 minutes. Further, a heat treatment was carried out at 85° C. for 1 hour under agitation, and then the obtained filtrate was separated by filtration, rinsed and dried at 105° C. to obtain 107.5 g of a $SrFe_{12}O_{19}$—$Mg_6Fe_2(OH)_{16}(Cl)_{2.0}$ composite particle precursor.

<Calcination>

The above hydrotalcite composite precursor particle was dried at 200° C. in an air atmosphere and calcined at 700° C. for 2 hours in an air atmosphere to obtain Sample 22.

Example 23

[Preparation of $Ni_{0.7}Mn_{0.3}Fe_2O_4$—$Zn_6Fe_2(OH)_{16}CO_3$ Composite Particle (150 wt % Composite)]

<Synthesis of Inner-Layer Hydrotalcite>

180.30 g (0.60 mol, 99% Wako special grade reagent) of $Zn(NO_3)_2.6H_2O$ and 81.62 g (0.20 mol, 99% Wako special grade reagent) of $Fe(NO_3)_3.9H_2O$ were added to deionized water to prepare 800 ml of an acidic aqueous solution containing Zn and Fe. The above acidic aqueous solution and 445 ml of a 3.5 mol/L NaOH aqueous solution containing 16 g of $Na_2CO_3$ were added to 300 ml of 37° C. deionized water at the same time by a squeegee pump over 90 minutes while they were kept at a pH of V. Further, the resulting solution was aged at 37° C. for 30 minutes under agitation, and then the obtained precipitate was separated by filtration, rinsed and dried at 185° C. to obtain 90 g of a Zn—Fe-based $CO_3$ type hydrotalcite powder.

When the obtained hydrotalcite was analyzed with a fluorescent X ray, it was a Zn—Fe-based $CO_3$ type hydrotalcite compound comprising 58.40 wt % of ZnO, 19.10 wt % of $Fe_2O_3$ and 7.18 wt % of $CO_3^{2-}$ and represented by the composition formula $Zn_{6.02}Fe_2(OH)_{16.04}CO_3$.

<Compounding of 150 wt % of $Ni_{0.7}Mn_{0.3}Fe_2O_4$ with Inner-Layer Hydrotalcite>

After 40 g of the above Zn—Fe-based $CO_3$ type hydrotalcite powder was added to 500 ml of deionized water and dispersed at 40° C. for 1 hour, 1,000 ml of an aqueous solution containing 54.0 g (0.182 mol, Wako reagent, 98 wt %) of $Ni(NO_3)_2.6H_2O$, 13.59 g (0.078 mol, Wako reagent, 97 wt %) of $MnSO_4.H_2O$ and 212.2 g (0.52 mol, Wako reagent, 99.9 wt %) of $Fe(NO_3)_3.9H_2O$ and 594.3 ml of a NaOH aqueous solution containing 2.08 mols of NaOH (3.5 mol/L) were added to the above hydrotalcite suspension at the same time by a squeegee pump over 120 minutes. Further, a heat treatment was carried out at 85° C. for 1 hour under agitation at 350 rpm, and then the obtained precipitate was separated by filtration, rinsed and dried at 110° C. to obtain 101 g of a Ni—Mn-based magnetic/Zn—Fe-based $CO_3$ type hydrotalcite precursor powder.

<Calcination>

The above Ni—Mn-based magnetic/Zn—Fe-based $CO_3$ type hydrotalcite precursor was calcined at 500° C. for 2 hours in an air atmosphere and naturally cooled to obtain Sample 23.

Comparative Examples 9 to 14

Comparative Example 9

An Mg—Al-based $CO_3$ type hydrotalcite particle was prepared in the same manner as in Example 14. However the $NiFe_2O_4$-based particle containing an excessive amount of Ni was not compounded.

Comparative Example 10

A Cu—Fe-based $CO_3$ type hydrotalcite particle was prepared in the same manner as in Example 15. However the $CuFe_2O_4$-based particle was not compounded.

Comparative Example 11

A Cu—Cr-based $CO_3$ type hydrotalcite particle was prepared in the same manner as in Example 16. However the $CuFe_2O_4$ was not compounded.

Comparative Example 12

A Ni,Co,Mg—Al-based $CO_3$ type hydrotalcite particle was prepared in the same manner as in Example 17. However the $Ni_{0.5}Co_{0.5}Fe_2O_4$ was not compounded.

Comparative Example 13

A Ni,Mg—Al-based $CO_3$ type hydrotalcite particle was prepared in the same manner as in Example 18. However the $Mn_{0.7}Cu_{0.3}Fe_2O_4$ (10.0 wt %) was not compounded.

Comparative Example 14

A particle was prepared in the same manner as in Example 19. However the $Ni_{0.5}Co_{0.5}Fe_2O_4$ (10.0 wt %) was not compounded.

[Ultraviolet Absorbing Effect]

Figure 9:
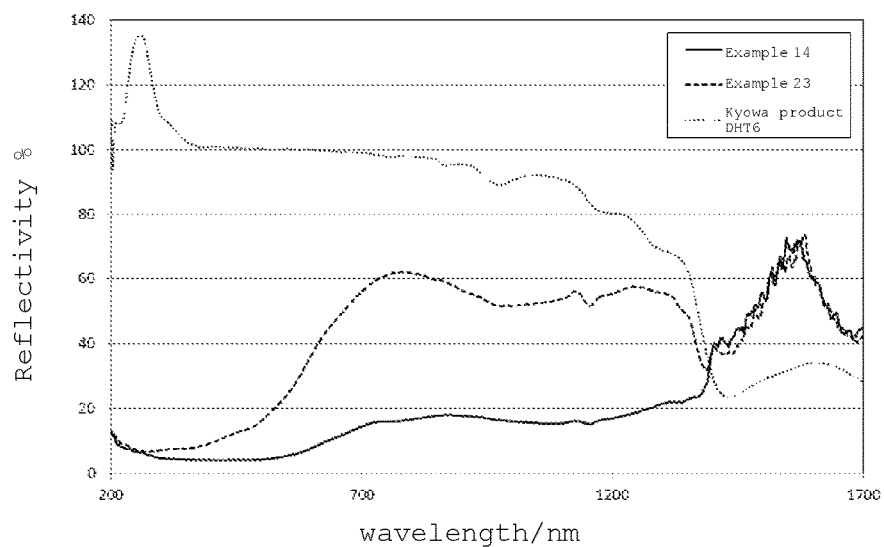
FIG. 9 shows the light absorbing effects of particles after molding.

The light absorbing effects measured with a spectrophotometer (HITACHI U-4100 Spectrophotometer) of samples having a diameter of 3 cm and a thickness of 3 mm prepared by molding powders are shown in FIG. 9. The composite particles of Example 14 and Example 23 exhibited strong reflection for infrared radiation having a wavelength of 1,395 to 1,700 nm. As compared with DHT6 of Kyowa Chemical Industry Co., Ltd. which is Ma-Al-based $CO_3$ type hydrotalcite, the composite particles of Example 14 and Example 23 exhibited strong absorption for UV-A waves (315 to 380 nm), UV-B waves (280 to 315 nm) and UV-C waves (up to 280 nm).

[Electromagnetic Wave Absorbing Effect]

Figure 11:
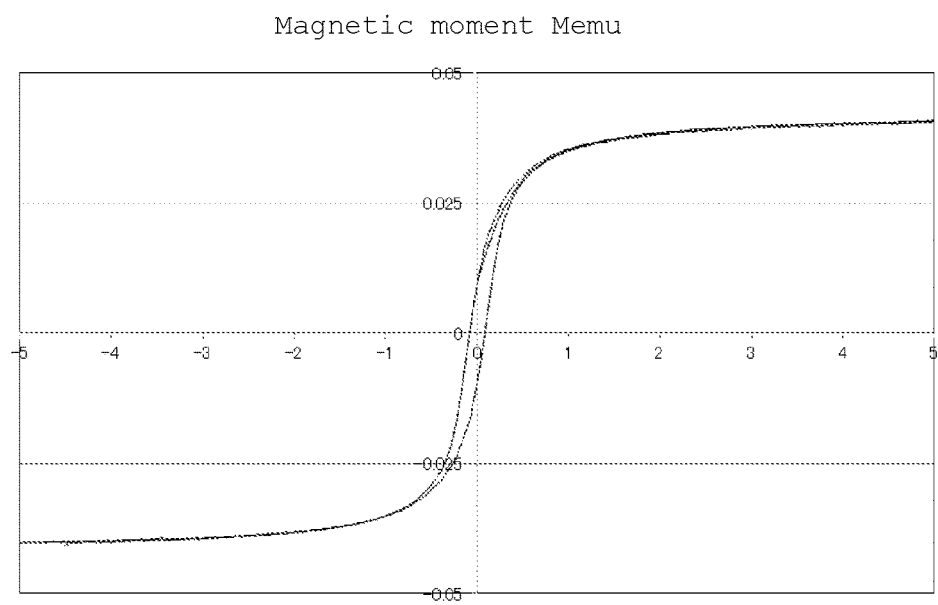
FIG. 11 shows the measurement result of magnetic moment of the particle of Example 22 with an oscillation type magnetometer.

The particles of Examples 14 to 23 exhibited strong magnetic property. The results of checking the existence of magnetic property with a magnet of each particle before and after compounding are shown in Table 5.

magnetometer is shown in FIG. 11. The composite particle was magnetized under the application of a magnetic field.

Figure 12:
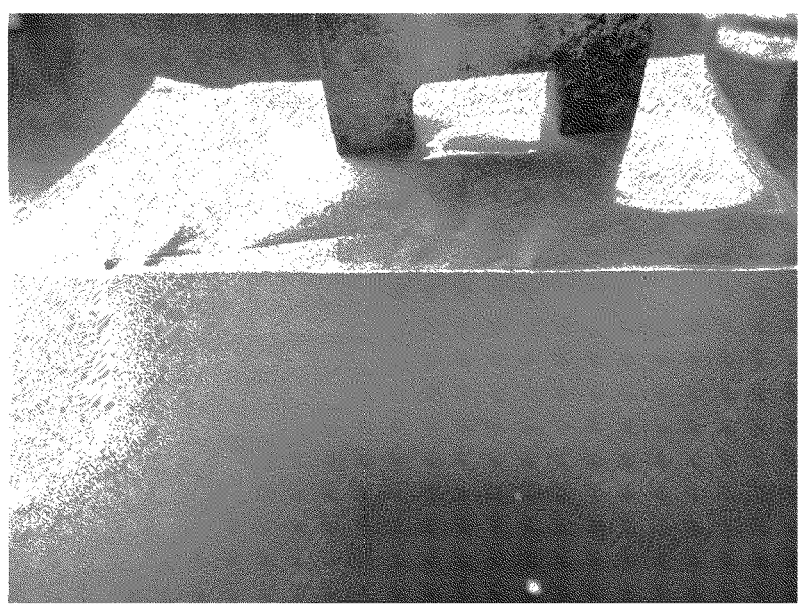
FIG. 12 shows a photo for the confirmation of the magnetic property of the particle of Example 22.

A photo for confirming the existence of magnetic force of the particle of Example 22 by using a magnet when it was put into a chucked polyethylene bag measuring 5 cm×7 cm×0.04 cm is shown in FIG. 12.

[Harmful Gas Adsorbing Effect]

30 mg of each composite particulate powder and 100 ppm of odor gas $H_2S$, COS, $CH_3SH$ or $CH_2CH_2$ for measurement were put into a Tedlar bag [called "1", size (mm) of

TABLE 5

| Items | Sample | | | | | | | |
|---|---|---|---|---|---|---|---|---|
| | Example 14 | Example 15 | Example 16 | Example 17 | Example 18 | Example 19 | Example 20 | Example 21 |
| Existence of magnetic property | magnetic | magnetic | magnetic | magnetic | magnetic | magnetic | magnetic | magnetic |

| Items | Sample | | | | | | | |
|---|---|---|---|---|---|---|---|---|
| | Example 22 | Example 23 | C. Ex. 9 | C. Ex. 10 | C. Ex. 11 | C. Ex. 12 | C. Ex. 13 | Japanese Patent Application No. 2008-144412 particle |
| Existence of magnetic property | magnetic | magnetic | non-magnetic | non-magnetic | non-magnetic | non-magnetic | non-magnetic | non-magnetic |

C. Ex.: Comparative Example

Figure 10:
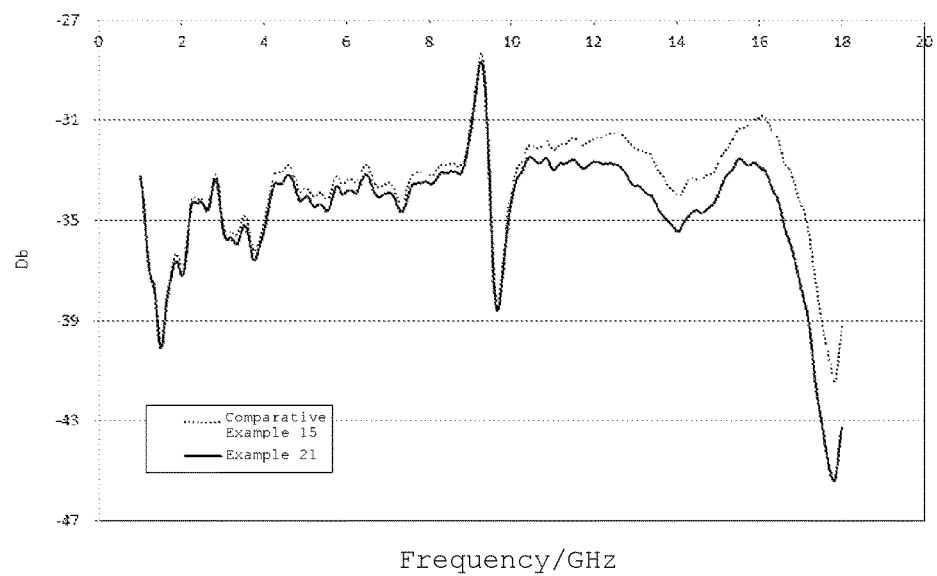
FIG. 10 shows electromagnetic wave absorbing effects measured by a free-space method.

After 60 wt % of each of the particles of Example 21 and Comparative Example 10 was kneaded with 40 wt % of linear low-density polyethylene and the kneaded product was molded into a sample measuring 10 cm×14 cm×0.2 cm, the electromagnetic wave absorbing effect of the molded product was measured by a free-space method. As a result, as shown in FIG. 10, it was confirmed that the obtained products had an electromagnetic wave absorbing effect. The sample of Example 21 exhibited stronger absorption than the sample of Comparative Example 10.

The measurement result of magnetic moment of the composite particle of Example 22 with an oscillation type 150×250, commodity code WEB0427] made of a fluororesin material and having a capacity of 1 L and left at room temperature (26° C.) for 5 minutes. Thereafter, the concentration of the gas in the Tedlar bag was analyzed by gas chromatography (GC-14B of Shimadzu Corporation). The removal rate obtained by the following equation (4) was calculated from the obtained result and shown in Table 6.

Removal rate (%)=gas concentration (ppm) before absorption−gas concentration (ppm) after absorption)/gas concentration (ppm) before absorption×100　　　(4)

TABLE 6

| | Item | | | |
|---|---|---|---|---|
| Samples | Hydrogen sulfide gas $H_2S$ | carbonyl sulfide gas COS | methyl mercaptane gas $CH_3SH$ | ethylene gas $CH_2CH_2$ |
| Sample 14 | 99.9 | 99.9 | 99.9 | 10 |
| Sample 15 | 99.9 | 99.9 | 99.9 | 15 |
| Sample 16 | 99.9 | 99.9 | 99.9 | 15 |
| Sample 17 | 99.9 | 99.9 | 99.9 | 12 |
| Sample 18 | 99.9 | 99.9 | 99.9 | 15 |
| Sample 19 | 99.9 | 99.9 | 99.9 | 15 |
| Sample 20 | 99.9 | 99.9 | 99.9 | 95 |
| Sample 21 | 99.9 | 99.9 | 99.9 | 15 |
| Sample 22 | 99.9 | 99.9 | 99.9 | 15 |
| Sample 23 | 99.9 | 99.9 | 99.9 | 15 |
| C. Ex. 9 | 85 | 80 | 80 | 2 |
| C. Ex. 10 | 88 | 75 | 75 | 2 |
| C. Ex. 11 | 80 | 80 | 80 | 2 |
| C. Ex. 12 | 85 | 80 | 80 | 2 |
| C. Ex. 13 | 80 | 80 | 80 | 2 |
| C. Ex. 14 | 85 | 85 | 85 | 2 |

TABLE 6-continued

| Samples | Hydrogen sulfide gas $H_2S$ | carbonyl sulfide gas COS | methyl mercaptane gas $CH_3SH$ | ethylene gas $CH_2CH_2$ |
|---|---|---|---|---|
| Commercially available active white clay | 3 | 5 | 5 | 2 |
| Commercially available activated carbon | 45 | 50 | 50 | 2 |

The particle of the present invention can be expected to be used as an ultraviolet absorbing agent or odor gas absorbing agent in addition to an electromagnetic wave absorbing agent. For example, it is effective for acid gases such as $NH_3$ and $H_2S$. A composite particle after exchange with $KMnO_4$, for example, the composite particle of Example 20 has an absorbing effect for a gas such as $CH_2CH_2$.

Further, since the particle of the present invention has the property of exchanging with an anion, when it is exchanged with an anion, a new function can be added to the composite particle of the present invention. For example, when it is exchanged with $KBrO_3$, a $BrO_3^-$ anion can be introduced between hydrotalcite layers. Since the $BrO_3^-$ anion has strong reducing property, it can be expected to be used as a wastewater treating agent containing $H_2O_2$, N,N-dimethyl-4-(phenyldiazenyl)benzenamine ($C_{14}H_{15}N_3$) or 4-dimethyl-aminoazobenzene-4-sulfonic acid sodium salt ($C_{14}H_{14}N_3NaO_3S$, methyl orange).

Effect of the Invention

The magnetic hydrotalcite composite of the present invention rarely agglomerates during calcination and has high dispersibility and high activity. When it is used as a catalyst, its recyclability is high. The magnetic hydrotalcite composite of the present invention can adsorb a plurality of ions with high efficiency.

According to the production method of the magnetic hydrotalcite composite of the present invention, by precipitating a ferrite substance on the surface of a hydrotalcite compound, agglomeration in the calcination step is suppressed, the surface activity of the hydrotalcite compound after calcination is improved, and recyclability can be improved when it is used as a catalyst.

INDUSTRIAL APPLICABILITY

The magnetic hydrotalcite composite of the present invention can be used as an adsorbent for harmful substances contained in soil, underground water or wastewater, electromagnetic wave absorbing agent or ultraviolet absorbing agent.

The invention claimed is:

1. A magnetic hydrotalcite composite comprising an inner layer and an outer layer, wherein the inner layer is made of a hydrotalcite compound represented by the following formula (1) and the outer layer is made of a ferrite compound represented by the following formula (2-1), (2-2) or (2-3):

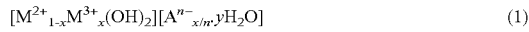

wherein in the formula (1), $M^{2+}$ is at least one divalent metal ion selected from the group consisting of $Mg^{2+}$, $Ca^{2+}$, $Mn^{2+}$, $Fe^{2+}$, $Co^{2+}$, $Ni^{2+}$, $Cu^{2+}$, $Zn^{2+}$, $Sr^{2+}$, $Cd^{2+}$ and $Pb^{2+}$, $M^{3+}$ is at least one trivalent metal ion selected from the group consisting of $La^{3+}$, $Al^{3+}$, $Ga^{3+}$, $Mn^{3+}$, $Co^{3+}$, $Y^{3+}$, $Ce^{3+}$, $Fe^{3+}$, $Cr^{3+}$ and $In^{3+}$, $A^{n-}$ is at least one n-valent anion selected from the group consisting of $CO_3^{2-}$, $SO_4^{2-}$, $Cl^-$, $SiO_3^{2-}$, $PO_4^{3-}$, $NO_3^-$, $OH^-$, $CH_3PO_4^{2-}$, $C_2O_4^{2-}$, $HCOO^-$, $CH_3COO^-$ and $CH_3SO_3^-$, x satisfies 0.15≤x≤0.5, y satisfies 0≤y<5, and n is an integer of 1 or more;

$$AFe_2O_4 \quad (2\text{-}1)$$

wherein in the formula (2-1), A is at least one selected from the group consisting of Ni, Zn, Cu, Mn, Co and Mg;

$$XFe_{12}O_{19} \quad (2\text{-}2)$$

wherein in the formula (2-2), X is at least one selected from the group consisting of Sr, Ba and Pb;

$$RFe_5O_{12} \quad (2\text{-}3)$$

wherein in the formula (2-3), R is a rare earth element in the fourth to sixth periods excluding actinoid of group 3 in the Periodic Table; and wherein a salt of at least one precious metal element selected from the group consisting of Au, Ag, Ru, Pt, Rh, Ir, Rb, Os and Pd is further supported on the outer layer in an amount of 0.2 to 5.0 wt % as a precious metal element.

2. The magnetic hydrotalcite composite according to claim 1, wherein the content of the ferrite compound in the outer layer is 0.5 to 95 wt %.

3. The magnetic hydrotalcite composite according to claim 1, wherein the atomic ratio of $M^{2+}$ and $M^{3+}$ of the hydrotalcite compound of the inner layer is 1.0:1.0 to 6.0:1.0.

4. An adsorbent for harmful substances contained in soil, underground water or wastewater, which comprises the magnetic hydrotalcite composite of claim 1.

5. An electromagnetic wave absorbing agent comprising the magnetic hydrotalcite composite of claim 1.

6. An ultraviolet absorbing agent comprising the magnetic hydrotalcite composite of claim 1.

7. A method of producing the magnetic hydrotalcite composite of claim 1, comprising the steps of:
    (1) producing the hydrotalcite compound of an inner layer at 20 to 270° C. by mixing a metal salt containing an element constituting the hydrotalcite compound of the inner layer with an alkaline solution to control the pH value of the resulting solution to 7 to 11;
    (2) forming an outer layer at 40 to 250° C. so as to produce a precursor by adding an acidic solution of a metal salt containing an element constituting the ferrite compound of the outer layer and an alkaline solution to a slurry containing the obtained hydrotalcite compound to control the pH value of the resulting solution to 7 to 11; and
    (3) calcining the precursor at a temperature range of 200 to 800° C.;
    to obtain the magnetic hydrotalcite composite of claim 1.

8. The production method according to claim 7, wherein a divalent metal ion salt constituting the hydrotalcite compound of the inner layer is at least one selected from the group consisting of $MgCl_2$, $CaCl_2$, $ZnCl_2$ and $FeCl_2$.

9. The production method according to claim 7, wherein a trivalent metal ion salt constituting the hydrotalcite compound of the inner layer is $AlCl_3$.

10. The production method according to claim 7, wherein an anion salt constituting the hydrotalcite compound of the inner layer is $Na_2CO_3$.

11. The production method according to claim 7, wherein a metal salt containing an element constituting the ferrite compound of the outer layer is at least one selected from the group consisting of $FeCl_3$, $MgCl_2$, $Ni(NO_3)$ and $ZnCl_2$.

* * * * *